United States Patent
Kuba

[11] Patent Number: 5,805,341
[45] Date of Patent: Sep. 8, 1998

[54] HEAD OR FACE MOUNTED IMAGE DISPLAY APPARATUS

[75] Inventor: Keiichi Kuba, Hachioji, Japan

[73] Assignee: Olympus Optical Co., Ltd., Tokyo, Japan

[21] Appl. No.: 715,797

[22] Filed: Sep. 19, 1996

[30] Foreign Application Priority Data

Sep. 20, 1995 [JP] Japan ................................ 7-241844
Jul. 19, 1996 [JP] Japan ................................ 8-190645

[51] Int. Cl.$^6$ .................................................. G02B 27/14
[52] U.S. Cl. ........................................ 359/630; 359/637
[58] Field of Search ................................. 359/630, 631, 359/633, 637, 638, 639, 640; 345/7, 8

[56] References Cited

U.S. PATENT DOCUMENTS

| | | | |
|---|---|---|---|
| 4,854,688 | 8/1989 | Hayford et al. | 359/433 |
| 5,035,474 | 7/1991 | Moss et al. | 359/13 |
| 5,124,821 | 6/1992 | Antier et al. | 359/14 |
| 5,245,475 | 9/1993 | Takasugi | 359/690 |
| 5,309,169 | 5/1994 | Lippert | 345/8 |
| 5,384,654 | 1/1995 | Iba | 359/364 |
| 5,504,622 | 4/1996 | Oikawa et al. | 359/630 |
| 5,539,578 | 7/1996 | Togino et al. | 359/630 |
| 5,576,887 | 11/1996 | Ferrin et al. | 359/631 |
| 5,612,709 | 3/1997 | Sudo et al. | 345/8 |

FOREIGN PATENT DOCUMENTS 3-38246  2/1991  Japan.
6-38246  2/1994  Japan.

*Primary Examiner*—Georgia Y. Epps
*Assistant Examiner*—Ricky Mack
*Attorney, Agent, or Firm*—Cushman Darby & Cushman IP Group of Pillsbury Madison & Sutro LLP

[57] ABSTRACT

A head- or face-mounted image display apparatus having compact and wide-field ocular optical systems designed to form readily fusible virtual images. When ocular optical systems having curvature of field are used for observer's right and left eyes, right and left virtual images (13R and 13L) are curved. The right and left ocular optical systems (11R and 11L) having curvature of field are disposed such that the positions of right and left virtual image surfaces are approximately coincident with each other in an area where the right and left virtual image surfaces overlap each other. With this arrangement, a wide field can be ensured, and moreover, the right and left virtual images can be readily fused because the right and left image surface positions are approximately coincident with each other in an area where the right and left image surfaces overlap each other. Accordingly, the user can perform observation with both eyes without fatigue.

12 Claims, 23 Drawing Sheets

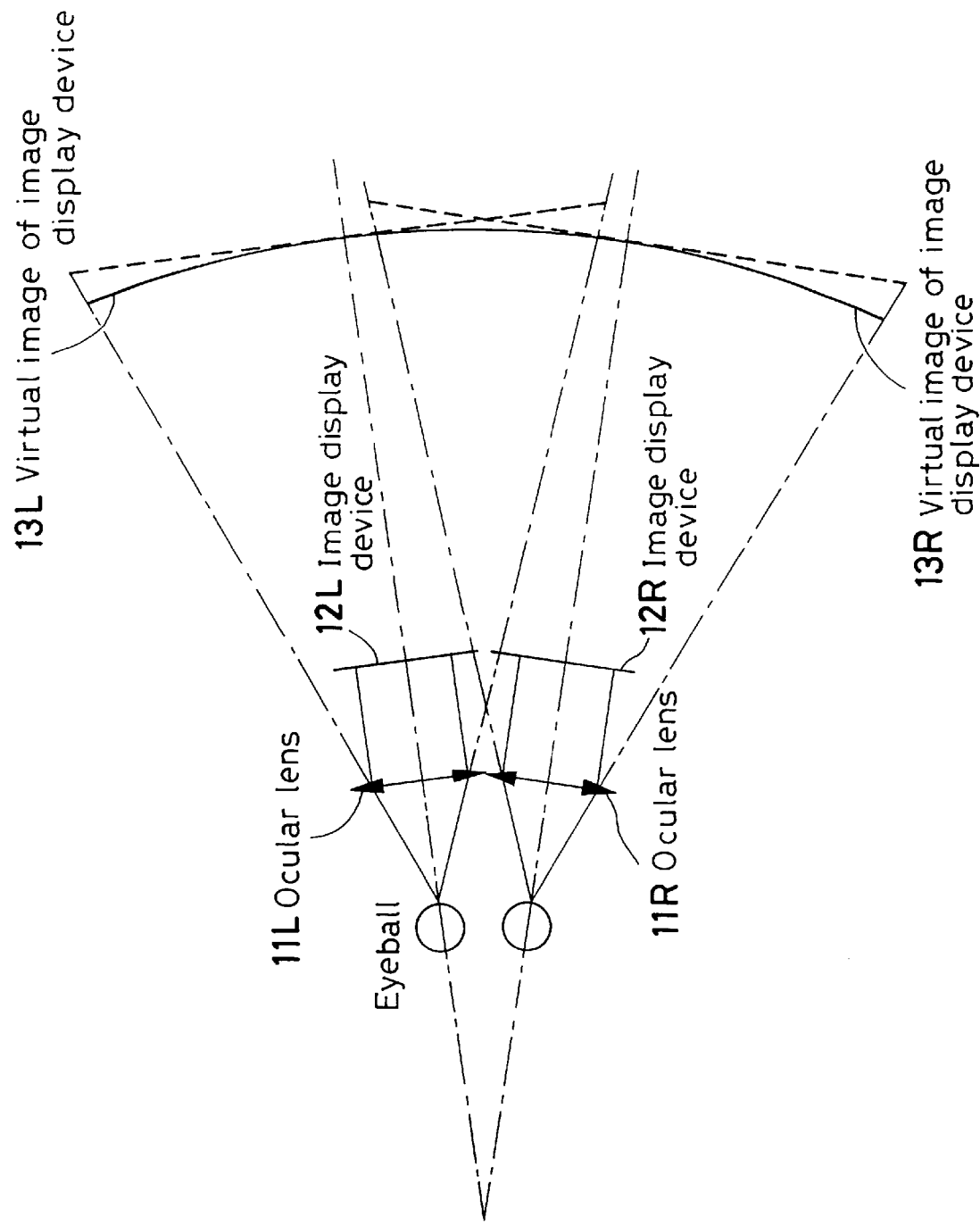

ically as an image height when the center of an image display device 12 and the corresponding optical axis are coincident with each other [see FIG. 27(*a*)], when the center of the image display device 12 is decentered from the optical axis by Δ [see FIG. 27(*b*)], the image height on the decentered side is X+Δ. Accordingly, the ocular optical system 11 must effect aberration correction for an increased field angle. This increases the load on the optical system.

HEAD OR FACE MOUNTED IMAGE DISPLAY APPARATUS

BACKGROUND OF THE INVENTION

The present invention relates to an image display apparatus and, more particularly, to a head- or face-mounted image display apparatus which is retained on a user's head or face to project an image into an observer's eyeball.

In recent years, helmet- and goggle-type head- or face-mounted image display apparatuses have been developed for virtual reality or for the purpose of enabling the user to enjoy a wide-screen image personally.

For example, U.S. Pat. No. 5,124,821 discloses an image display apparatus in which, as shown in the side view of FIG. 23, an image displayed on a CRT 1 is formed as an intermediate image by a relay lens 2, and the intermediate image is projected into an eyeball by a collimator 4A (or 4B). The apparatus uses a hologram combiner 3A (or 3B) disposed between the relay lens 2 and the collimator 4A (or 4B). Therefore, it is possible to reflect display light of wavelength $\lambda_0$ from the CRT 1 and to transmit outside world light of wavelength other than $\lambda_0$. Accordingly, an electronic image and an outside world image can be efficiently superimposed on one another.

As shown in the plan view of FIG. 24, the conventional image display apparatus is arranged such that a visual field area which is mutually seen with both eyes, i.e. an overlap area, is a part (50°) of a field angle for a single eye. With this arrangement, a wide horizontal field angle, i.e. 120°, is obtained.

In Japanese Patent Application Unexamined Publication (KOKAI) No. 6-38246, as shown in the plan view of FIG. 25, the center of an image display device 12R for the right eye is shifted rightward, while the center of an image display device 12L for the left eye is shifted leftward, and images displayed on the image display devices 12R and 12L are observed through respective ocular lenses 11R and 11L as enlarged images, thereby widening the observation field angle.

However, the arrangement as shown in FIG. 24 suffers from the following problems: As shown in FIG. 26, if an angle α is given between the optical axis of an ocular optical system 11R (4A in FIG. 24) for the right eye and the optical axis of an ocular optical system 11L (4B in FIG. 24) for the left eye, the positions (diopters) of virtual images 13R and 13L of the image display devices 12R and 12L in the overlap area differ from each other. Therefore, the two images are difficult to fuse into a single image. This causes the observer to become fatigued.

The arrangement as shown in FIG. 25 suffers from the following problems: As shown in FIGS. 27(*a*) and 27(*b*), assuming that X is an image height when the center of an image display device 12 and the corresponding optical axis are coincident with each other [see FIG. 27(*a*)], when the center of the image display device 12 is decentered from the optical axis by Δ [see FIG. 27(*b*)], the image height on the decentered side is X+Δ. Accordingly, the ocular optical system 11 must effect aberration correction for an increased field angle. This increases the load on the optical system.

Moreover, in a case where the optical systems for the right and left eyes each use a bilaterally asymmetric optical system, for example, an optical system using, as shown in FIG. 28, a prism P including a concave mirror M and a half-mirror H, identical optical systems cannot be used for both the right and left eyes. Consequently, it is necessary to prepare two different types of ocular optical system, and the cost unfavorably increases.

SUMMARY OF THE INVENTION

In view of the above-described problems of the conventional techniques, an object of the present invention is to provide a head- or face-mounted image display apparatus having compact and wide-field ocular optical systems designed to form readily fusible virtual images.

To attain the above-described object, the present invention provides an image display apparatus which is applicable to a head- or face-mounted image display apparatus including an image display unit for displaying an image. The apparatus further has a right optical system for leading the image to an observer's right eye, and a left optical system for leading the image to an observer's left eye. According to the present invention, the right and left optical systems have such curvature of field that the image surface position of a right virtual image for the observer's right eye formed by the right optical system and the image surface position of a left virtual image for the observer's left eye formed by the left optical system are approximately coincident with each other in at least an overlap area where the two virtual images overlap each other.

In this case, it is desirable for the right and left optical systems to have such curvature of field that the right and left virtual images are formed on approximately the same curved surface in at least the overlap area.

It is preferable that the angle between the right and left optical systems should be variable according to positions where the right and left virtual images are formed or according to proportions in which the two virtual images overlap so that the image surface positions of the right and left virtual images are approximately coincident with each other in an area where the image surfaces of the two virtual images overlap each other.

It is also preferable for each optical system to have positive curvature of field (i.e. curvature of field in which the center of curvature of an image surface lies in the positive direction of the optical axis when light rays are traced from the virtual image side toward the ocular lens side). It is preferable for each optical system to have a concave mirror. In this case, it is preferable to satisfy the following condition:

$$-1.2 < PS \cdot f < 0.2 \qquad (3)$$

where f is the focal length of the optical system, and PS is Petzval sum of the optical system.

It is preferable that the right and left virtual images should overlap each other through at least 30°.

The above-described image display apparatus may be arranged such that an optical axis led from the right optical system to the observer's right eye and an optical axis led from the left optical system to the observer's left eye are approximately parallel to each other, and that the image display unit has a right image display device for forming an image for the observer's right eye, and a left image display device for forming an image for the observer's left eye, and further that the right and left image display devices are displaced toward each other.

In this case, it is desirable that the right and left image display devices should be tilted in opposite directions to each other.

It is desirable that the right and left ocular optical systems should be formed so as to add positive curvature of field, and the right and left image display devices should be tilted in respective directions in which lines normal to their image display surfaces approach each other. Alternatively, it is desirable that the right and left optical systems should be formed so as to add negative curvature of field, and the right and left image display devices should be tilted in respective directions in which lines normal to their image display surfaces come away from each other.

Another image display apparatus according to the present invention is applicable to a head- or face-mounted image display apparatus including an image display unit and an optical system for projecting an image displayed by the image display unit into an observer's eyeball. According to the present invention, a part of the optical system is decentered, and the position of a virtual image is shifted in a plane perpendicular to an optical axis.

In this case also, it is preferable that a virtual image for the observer's right eye and a virtual image for the observer's left eye should overlap each other through at least 30°.

Still another image display apparatus according to the present invention is applicable to a head- or face-mounted image display apparatus including an image display unit and an optical system for projecting an image displayed by the image display unit into an observer's eyeball. According to the present invention, the optical system includes an optical system of infinite diopter and an optical system of negative power.

In this case, it is preferable that either the optical system of infinite diopter or the image display unit should be decentered. It is also preferable that the amount of decentration of either the optical system of infinite diopter or the image display unit should be variable. Moreover, it is preferable that a virtual image for the observer's right eye and a virtual image for the observer's left eye should overlap each other through at least 30°.

The reason for adopting the above-described arrangements and the functions thereof will be explained below.

FIG. 1 shows the principle of the present invention. When ocular optical systems having curvature of field are used for observer's right and left eyes, right and left virtual images 13R and 13L are curved. The right and left ocular optical systems 11R and 11L having curvature of field are disposed as shown in FIG. 1 such that the positions of right and left virtual image surfaces are approximately coincident with each other in an area where the right and left virtual image surfaces overlap each other. With this arrangement, a wide field can be ensured, and moreover, the right and left virtual images can be readily fused because the right and left image surface positions are approximately coincident with each other in an area where the right and left image surfaces overlap each other. Accordingly, the user can perform observation with both eyes without fatigue.

If images with a disparity therebetween are displayed on image display devices 12R and 12L, and these images are observed with both eyes, it is possible to observe a stereoscopic image by binocular parallax.

Further, because ocular optical systems having curvature of field can be used as the right and left ocular optical systems 11R and 11L, the load on the ocular optical systems is reduced. This is favorable from the viewpoint of designing ocular optical systems.

In this case, the left and right image display devices 12L and 12R are arranged to display respective images as shown in FIGS. 2(a) and 2(b). This makes it possible to obtain a composite image as shown in FIG. 2(c). That is, the center CL of the image displayed on the left image display device 12L is displaced leftward from the center of the composite image, whereas the center CR of the image displayed on the right image display device 12R is shifted rightward from the center of the composite image.

In the arrangement shown in FIG. 1, the right and left ocular optical systems 11R and 11L have positive curvature of field (i.e. curvature of field in which the center of curvature of an image surface lies in the positive direction of the optical axis); the same is true in a case where the right and left ocular optical systems 11R and 11L have negative curvature of field (i.e. curvature of field in which the center of curvature of an image surface lies in the negative direction of the optical axis).

Incidentally, the curved condition of curvature of field is variable according to the positions where the virtual images 13R and 13L are formed. For the sake of simplicity, let us consider curvature of field in the domain of third-order aberration and the Petzval surface as a spherical surface with a radius R of curvature. To change the diopter or to change the proportion of an area where virtual images for the right and left eyes overlap each other, it is preferable to change, as shown in FIG. 3, the angle between two optical axes such that the centers of curvature of the two virtual images 13R and 13L coincide with each other at the point O. By doing so, even if the diopter or the proportion of the overlap area is changed, the right and left virtual image surface positions are kept approximately coincident with each other in the area where the right and left virtual image surfaces coincide with each other.

FIG. 3 shows an arrangement where each optical system has positive curvature of field (i.e. curvature of field in which the center of curvature of an image surface lies in the positive direction of the optical axis); FIG. 4 shows an arrangement where each optical system has negative curvature of field (i.e. curvature of field in which the center of curvature of an image surface lies in the negative direction of the optical axis). The arrangement shown in FIG. 4 has some problems in comparison to the arrangement in which each optical system has positive curvature of field.

The following equation must hold in order to allow the right and left virtual image surface positions to coincide with each other in an area where the right and left virtual image surfaces overlap each other:

$$d=2(R+D)\sin(\alpha/2) \qquad (1)$$

where d is the interpupillary distance (distance between the two eyes), D is the diopter (distance from an eyeball to a virtual image), R is the radius of curvature of an image surface, and $\alpha$ is the angle between the optical axis of the right ocular lens 11R and the optical axis of the left ocular lens 11L, and where R>0 and D>0.

As shown in FIG. 4, the angle between the optical axis of the right ocular lens 11R and the optical axis of the left ocular lens 11L is always convergent (i.e. the optical axis of the right ocular lens 11R tilts leftward, whereas the optical axis of the left ocular lens 11L tilts rightward).

As (R+D) decreases, it becomes more likely that interference will occur between the right and left image display devices 12R and 12L or between the right and left ocular lenses 11R and 11L. Therefore, there is a limit in the variable range of the diopter or the overlap area of the right and left virtual image surfaces.

In contrast, when each ocular optical system has positive curvature of field, the following equation must hold in order to allow the right and left virtual image surface positions to be approximately coincident with each other in the overlap area of the right and left virtual image surfaces:

$$d = 2(R-D)\sin(\alpha/2) \tag{2}$$

where d is the interpupillary distance, D is the diopter (distance from an eyeball to a virtual image), R is the radius of curvature of an image surface, and α is the angle between the optical axis of the right ocular lens 11R and the optical axis of the left ocular lens 11L, and where R>0 and D>0.

The angle between the optical axis of the right ocular lens 11R and the optical axis of the left ocular lens 11L is always divergent (i.e. the optical axis of the right ocular lens 11R tilts rightward, whereas the optical axis of the left ocular lens 11L tilts leftward).

The tilt directions of the two ocular lenses 11R and 11L are directions for preventing interference between the right and left image display devices 12R and 12L or between the right and left ocular lenses 11R and 11L. Accordingly, the arrangement where each optical system has positive curvature of field and which is related to Eq. (2) can have a larger angle α.

Incidentally, a refracting lens of positive power has negative curvature of field, whereas a refracting lens of negative power has positive curvature of field. Accordingly, if it is intended to construct an ocular optical system having positive power and positive curvature of field by using a refracting optical system, convex and concave lenses must be combined, which results in a complicated optical system. In contrast, a concave mirror has positive power and positive curvature of field, which is convenient for construction of an ocular optical system according to the present invention. Moreover, an optical system having a concave mirror produces small aberrations, including chromatic aberrations. This is advantageous.

The condition for the Petzval sum of a prism-type concave mirror (back-coated mirror) is given as follows: Assuming that ø is the power, f is the focal length, n is the refractive index of a medium contacting the concave mirror (back-coated mirror), r is the paraxial curvature radius of the concave mirror, and PS is the Petzval sum, $$\phi = (-n-n)/(-r) = 2n/r$$

$$PS = \{\phi/(-n)\}/n = -2/nr$$

$$\therefore PS.f = -1/n^2 < 0 \text{ (positive curvature of field)}$$

Assuming that $1 \leq n < 1.9$, $$-1 \leq PS.f < -0.28$$

Incidentally, a concave mirror produces positive comatic aberration and astigmatism occurring on the negative side of the Petzval surface. Therefore, an essential virtual field curvature R when coma, astigmatism, etc. are taken into consideration is on the negative side of the Petzval surface. In actual practice, a lens of positive power may be added in order to ensure a wide field angle and to correct chromatic aberrations, and a lens of negative power may be added in order to ensure the telecentricity on the side of a liquid crystal display (LCD) used as an image display device and to correct distortion. When the use of such lenses is considered, it is desirable to satisfy the following condition:

$$-1.2 < PS.f < 0.2 \tag{3}$$

If PS.f is not larger than the lower limit of the condition (3), i.e. −1.2, the telecentricity on the LCD side is ensured and distortion is favorably corrected by the lens of negative power. However, the amount of curvature of field becomes excessively large. If PS.f is not smaller than the upper limit of the condition (3), i.e. 0.2, a wide field angle is ensured and chromatic aberrations are favorably corrected by the added lens of positive power. However, the essential image surface fails to have positive curvature of field.

It is more desirable to satisfy the following condition:

$$-1.0 \leq PS.f < -0.1 \tag{4}$$

It is even more desirable to satisfy the following condition:

$$-1.0 \leq PS.f < -0.3 \tag{5}$$

It should be noted that the concave surface of the concave mirror may be decentered with respect to the optical axis.

In the case of an ordinary refracting ocular lens, e.g. a magnifier, PS.f=1/n. Assuming that 1.4<n<1.9, PS.f is given by $$0.52 < PS.f < 0.72$$

FIG. 22 shows viewing angle characteristics of human eyes (Journal of Precision Engineering Society 57/8/1991). In the figure: (1) denotes a distinction visual field in which high-density information reception can be effected; (2) denotes an effective visual field in which information reception can be effected by the motion of the eyes without much efforts; (3) denotes a steady gaze visual field in which information reception can be effected by the motion of the eyes and the head without much efforts; (4) denotes an induction visual field in which the wide field effect is saturated; and (5) denotes a marginal auxiliary visual field in which the observer notices only the presence of strong stimulation. Accordingly, if an area where the virtual images 13R and 13L overlap each other covers the effective visual field (2) (±15°), it is possible to observe and fuse the images for the right and left eyes at the center of the visual field, where high resolution is required.

Incidentally, the discussion given with reference to FIGS. 3 and 4 is based on the assumption that the left and right image display devices 12L and 12R are not decentered with respect to the left and right ocular optical systems 11L and 11R. Let us abandon the assumption and consider shifting the image display devices 12L and 12R inward toward each other. In this case, the left and right visual axes are convergent with the optical axes of the ocular optical systems 11L and 11R left parallel to each other. That is, the vergence angle is convergent (convergence angle). Therefore, it is generally easy to observe the image.

However, shifting the image display devices 12L and 12R inward as described above causes an increase in the amount of displacement between the left and right image surfaces in an area where the left and right virtual images 13L and 13R overlap each other, as shown in FIG. 5, which illustrates the conditions of the left and right virtual images 13L and 13R.

FIG. 6 shows an optical system for the left eye in a case where the optical system has positive curvature of field. Assuming that α is the vergence angle and M is the lateral magnification of the ocular optical systems 11L and 11R, the left image display device 12L should be tilted through an angle α/(2M²) (i.e. the image display devices 12L and 12R should be tilted in respective directions in which lines normal to the eyeball-side surfaces of the left and right image display devices 12L and 12R approach each other) in order to rotate the image surface 13L through an angle α/2 and to allow the position of the center of curvature of the image surface 13L to coincide with the point P' on the extension of a straight line passing through the midpoint of a straight line connecting the left and right eyes at right angles to the latter straight line, as shown in FIG. 6. Tilting the left and right image display devices 12L and 12R as described above enables the left and right image surfaces 13L and 13R to overlap each other in the overlap area without displacement therebetween.

An ocular optical system using a concave mirror produces small aberrations, including chromatic aberrations, and has positive curvature of field. Therefore, when the ocular optical systems 11L and 11R use such concave mirrors, the image display devices 12L and 12R are shifted toward each other and tilted in respective directions in which lines normal to the eyeball-side surfaces of the image display devices 12L and 12R approach each other, as shown in FIG. 6. By doing so, the left and right image surfaces 13L and 13R can be made coincident with each other in the overlap area.

When each optical system has negative curvature of field, as shown in FIG. 7 (which illustrates only an optical system for the left eye), the left and right image display devices 12L and 12R should be tilted in respective directions in which lines normal to the eyeball-side surfaces of the left and right image display devices 12L and 12R come away from each other. This enables the left and right image surfaces 13L and 13R to overlap each other in the overlap area without displacement therebetween.

Moreover, keeping the optical axes of the ocular optical systems 11L and 11R parallel to each other as described above facilitates mechanical designing of the image display apparatus. If the ocular optical systems 11L and 11R are arranged to be telecentric on the image display device side, it is possible to minimize fluctuation in aberrations, e.g. variation of the exit pupil position.

It should be noted that, in FIGS. 6 and 7, the tilt of the image display device 12L is emphatically shown because these figures illustrate the principle of the present invention, and that, in practice, the image display devices 12L and 12R are tilted according to Scheimflug's conditions (basic principle of swing & tilt).

FIG. 8 shows the principle of the image display apparatus according to another aspect of the present invention. An ocular optical system 11 comprises partial systems 11-1 and 11-2. The partial system 11-1 and an image display device 12 are decentered from the optical axis, as shown in FIG. 8. This enables the virtual image to shift in a plane perpendicular to the optical axis. If left and right ocular optical systems 11L and 11R, which are arranged as described above, are disposed as shown in FIG. 9, there is no diopter difference between left and right image surfaces 13L and 13R at a position where the two image surfaces 13L and 13R overlap each other, which has heretofore given rise to a problem. Accordingly, it is possible to achieve a wide field angle.

Moreover, the above-described arrangement makes it possible to prevent interference between the partial systems 11-1 of the right and left ocular optical systems 11R and 11L or between the left and right image display devices 12.

It should be noted that the partial system 11-2 of the ocular lens 11 needs to be corrected for aberrations for a wider field angle ε, whereas the partial system 11-1 needs to undergo aberration correction for only a field angle in a necessary range after the decentration. Therefore, there is no increase in the aberration correcting load on the ocular lens 11.

In this case also, if an area where the virtual images 13R and 13L overlap each other covers the effective visual field (±15°), it is possible to observe and fuse the images for the right and left eyes at the center of the visual field, where high resolution is required.

FIGS. 10 to 12 show the principle of the image display apparatus according to still another aspect of the present invention. As shown in FIG. 10, an ocular optical system 11 comprises a collimator 11A and a negative power system 11B. Light from an image displayed on an image display device 12 is formed into parallel rays by the collimator 11A and then formed as a virtual image 13 by the negative power system 11B. In this case, if the collimator 11A and the image display device 12 are decentered as shown in FIG. 11, the field angle β above the optical axis is smaller than the field angle γ below the optical axis, i.e. β<γ, and the position of the virtual image 13 also shifts downward as viewed in the figure. However, the virtual image 13 is perpendicular to the optical axis.

If such an optical system is disposed for each of left and right eyes as shown in FIG. 12, there is no diopter difference between left and right image surfaces 13L and 13R at a position where the two image surfaces 13L and 13R overlap each other, which has heretofore given rise to a problem. Accordingly, it is possible to achieve a wide field angle.

In this case, the negative power system 11B (11BL and 11BR) produces small aberrations on a side (β side) closer to the visual field center, where high resolution is required from the viewpoint of the properties of the user's eyes, while it produces relatively large aberrations on a side (γ side), where very high resolution is not required from the viewpoint of the properties of the user's eyes. This is very convenient.

Although in the illustrated arrangement the collimator 11A is tilted as shown in FIG. 11, it may be decentered.

It should be noted that the proportion of an area where virtual images for the left and right eyes overlap each other (i.e. the ratio of β to γ) can be changed by changing the amount of tilt (=γ−β) of the optical system comprising the collimator 11A and the image display device 12. In this case, the position (diopter) and the inclination of the virtual image are unchanged (i.e. the virtual image is left perpendicular to the optical axis; see FIGS. 10 and 11).

Although in FIG. 11 the optical system comprising the collimator 11A and the image display device 12 is tilted as one unit, the image display device 12 alone may be tilted or decentered.

In this case also, if an area where the virtual images 13R and 13L overlap each other covers the effective visual field (±15°), it is possible to observe and fuse the images for the right and left eyes at the center of the visual field, where high resolution is required.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 shows the principle of an image display apparatus according to a first aspect of the present invention.

DESCRIPTION OF THE PREFERRED EMBODIMENTS

Examples 1 to 5 of optical systems usable in head-mounted image display apparatuses according to the present invention will be described below with reference to FIGS. 13 to 22.

Figure 2A:
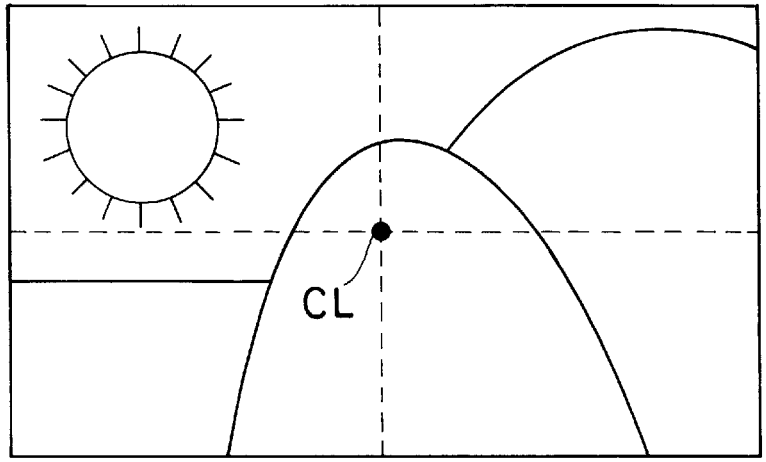
FIGS. 2(a), 2(b) and 2(c) show images displayed by image display devices and a composite image in the image display apparatus according to the first aspect of the present invention.
Figure 2B:
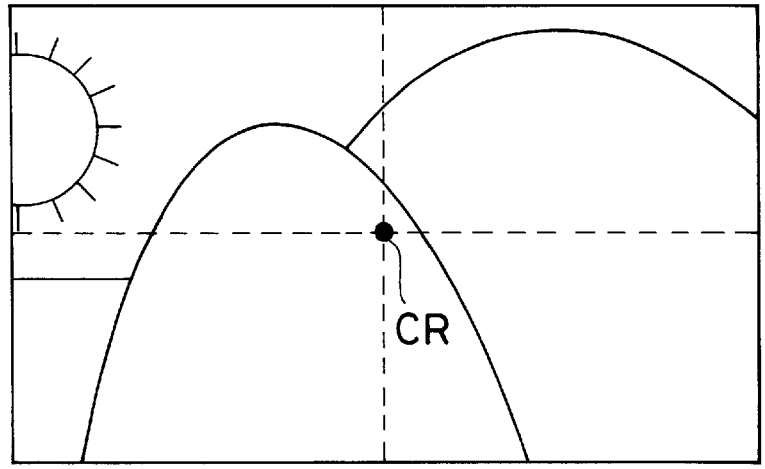
Figure 2C:
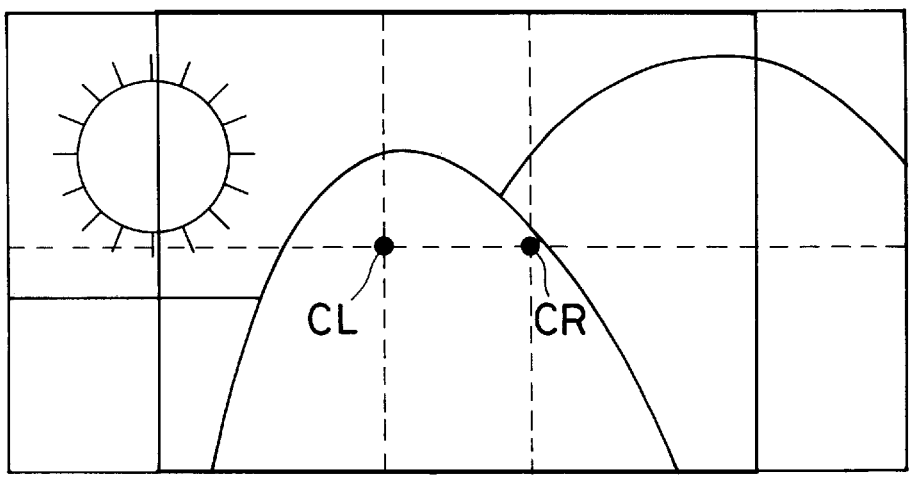
Figure 3:
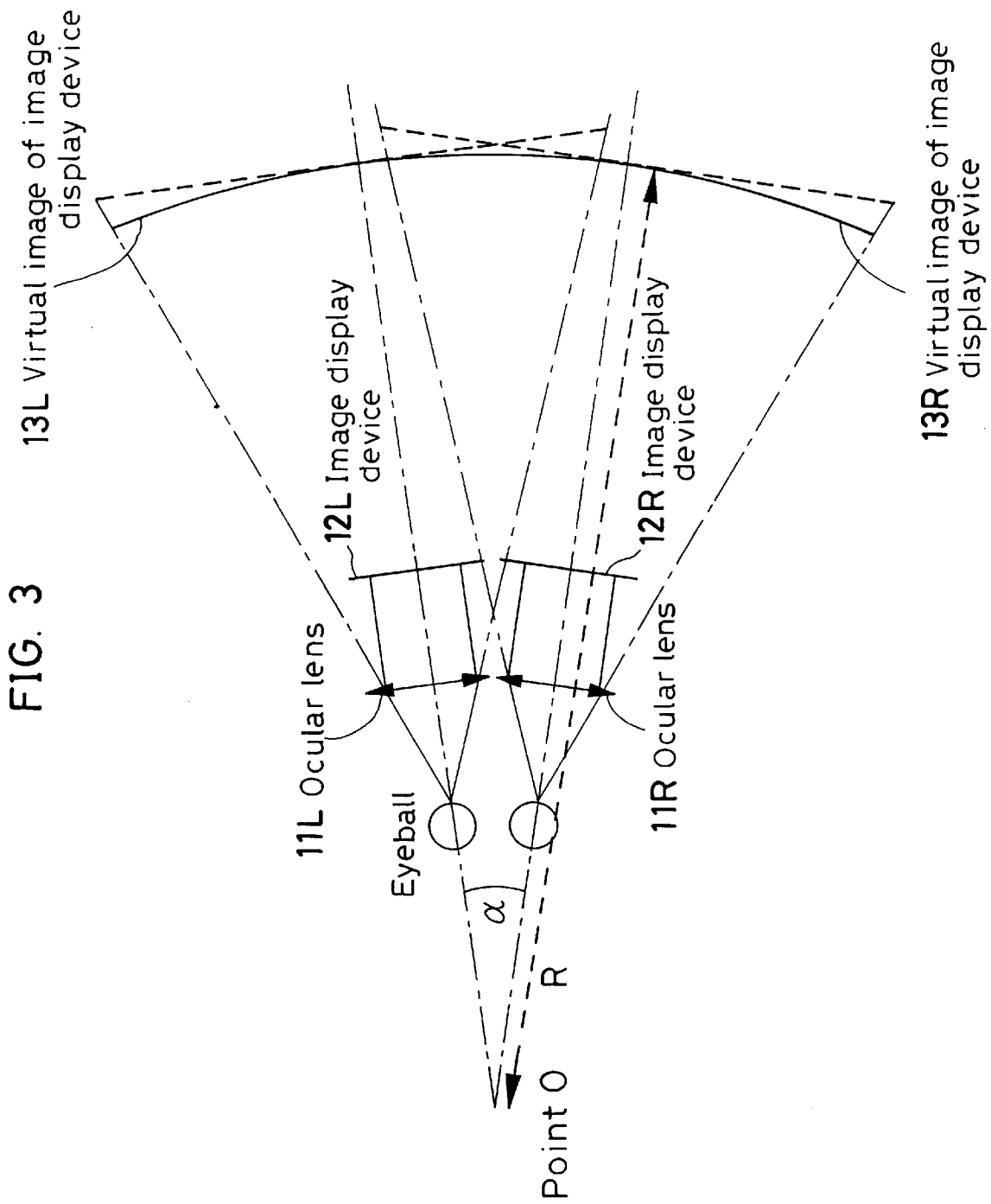
FIG. 3 shows the principle of diopter change or change of the proportion of an overlap area in the case of positive curvature of field.
Figure 4:
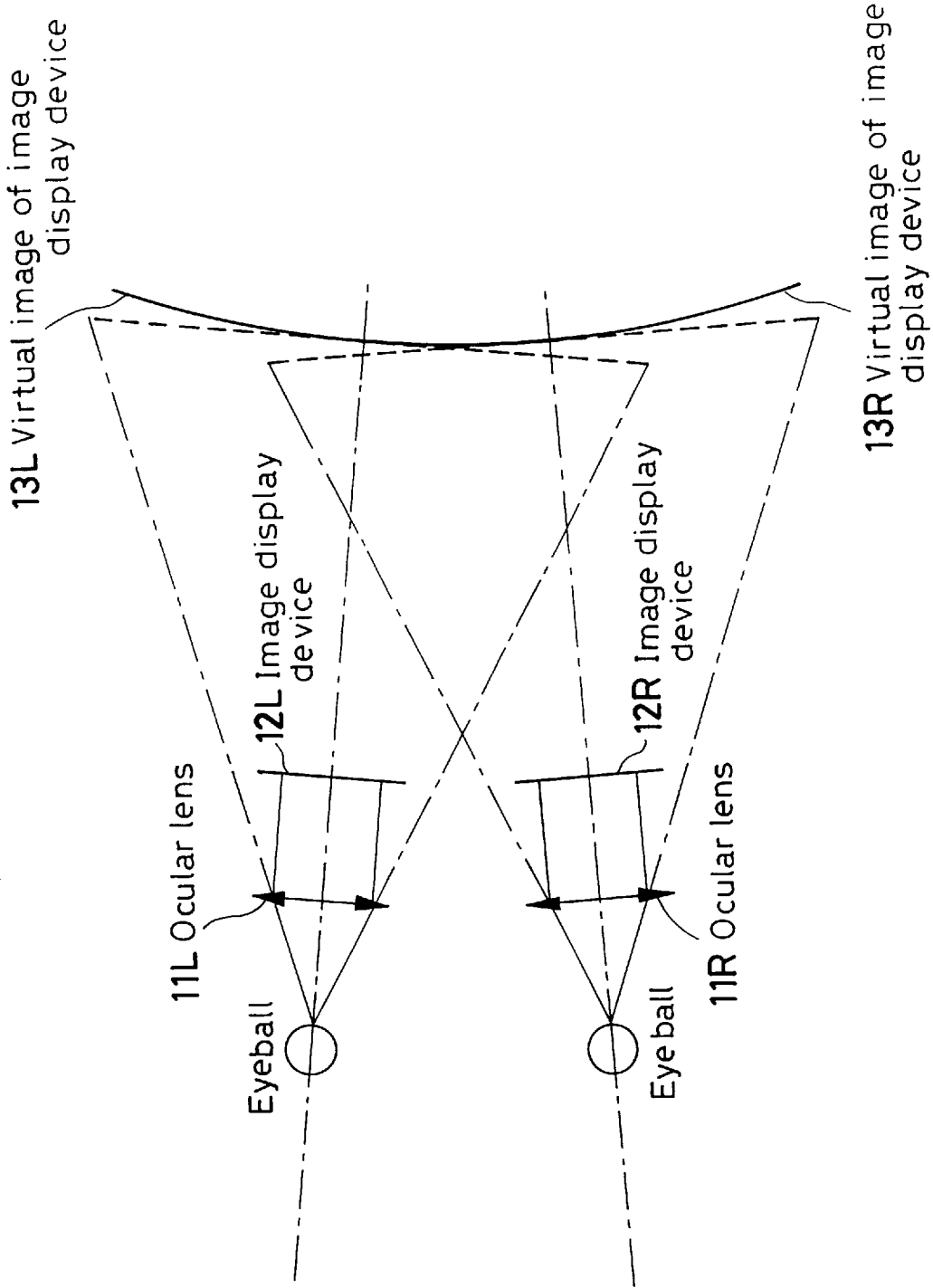
FIG. 4 shows the principle of diopter change or change of the proportion of an overlap area in the case of negative curvature of field.
Figure 5:
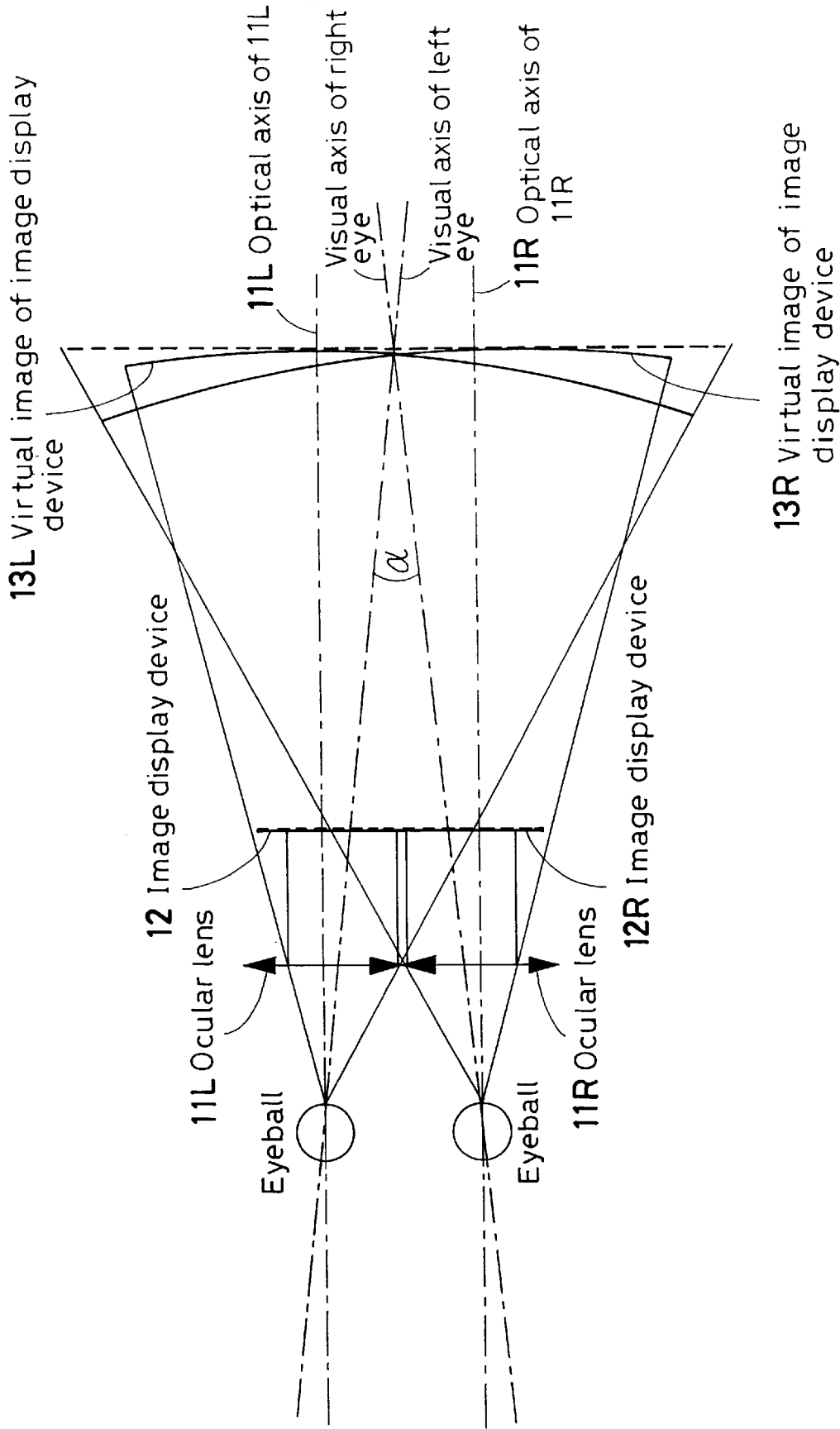
FIG. 5 is a view for the explanation of problems arising when image display devices are shifted inward.
Figure 6:
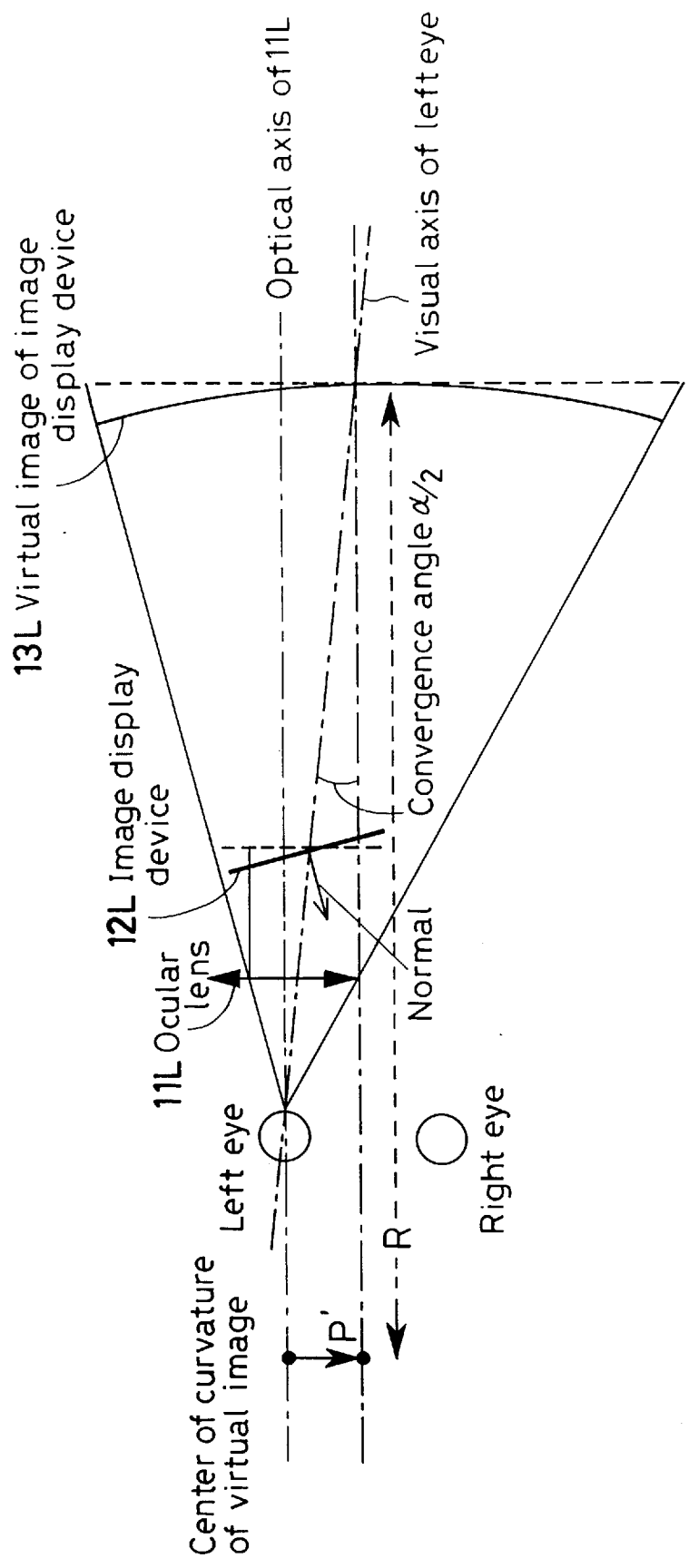
FIG. 6 is a view for the explanation of the principle of making left and right image surfaces coincident with each other by shifting and tilting image display devices in the case of positive curvature of field.
Figure 7:
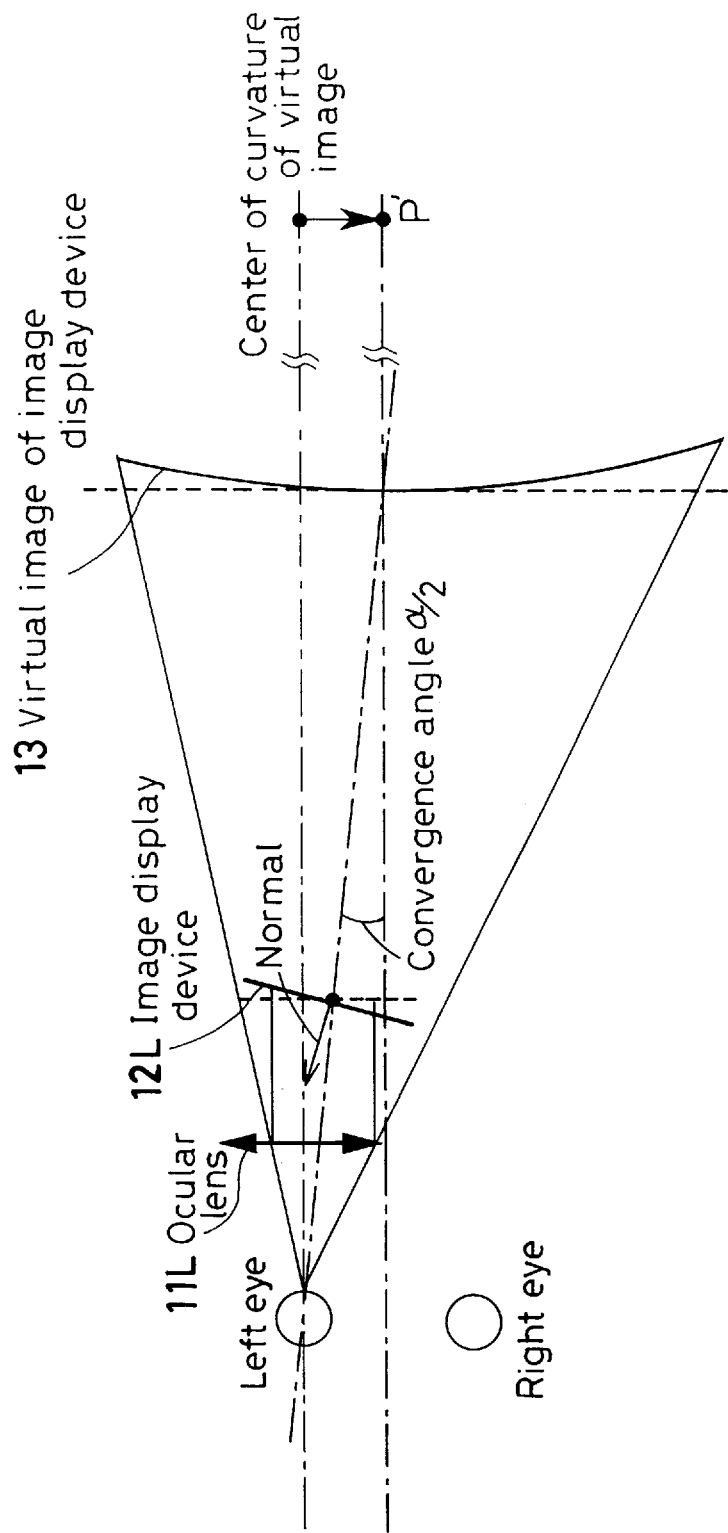
FIG. 7 is a view similar to FIG. 6 in the case of negative curvature of field.
Figure 8:
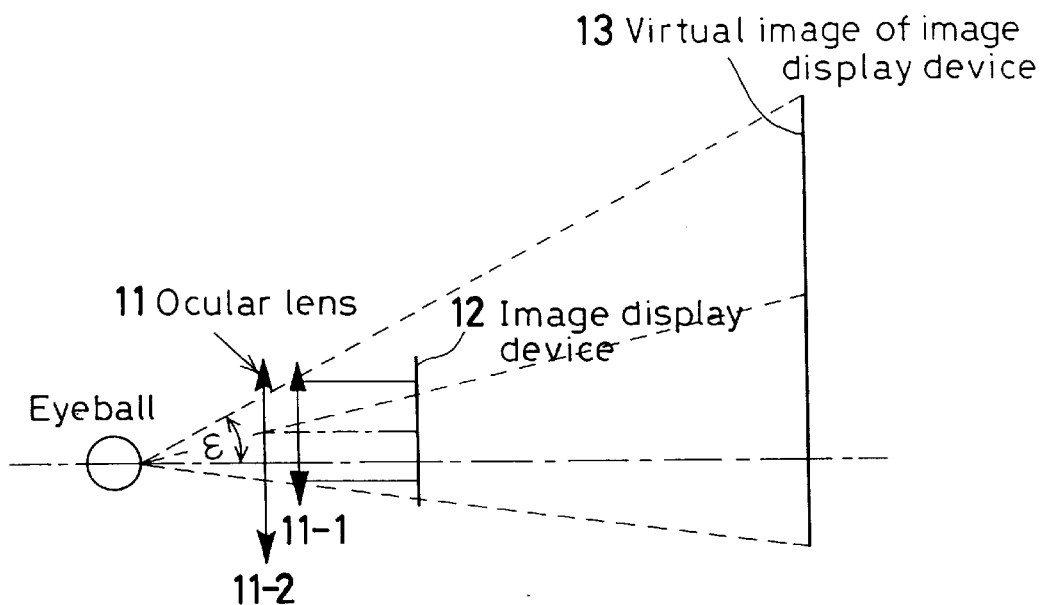
FIG. 8 shows the principle of an image display apparatus according to a second aspect of the present invention.
Figure 9:
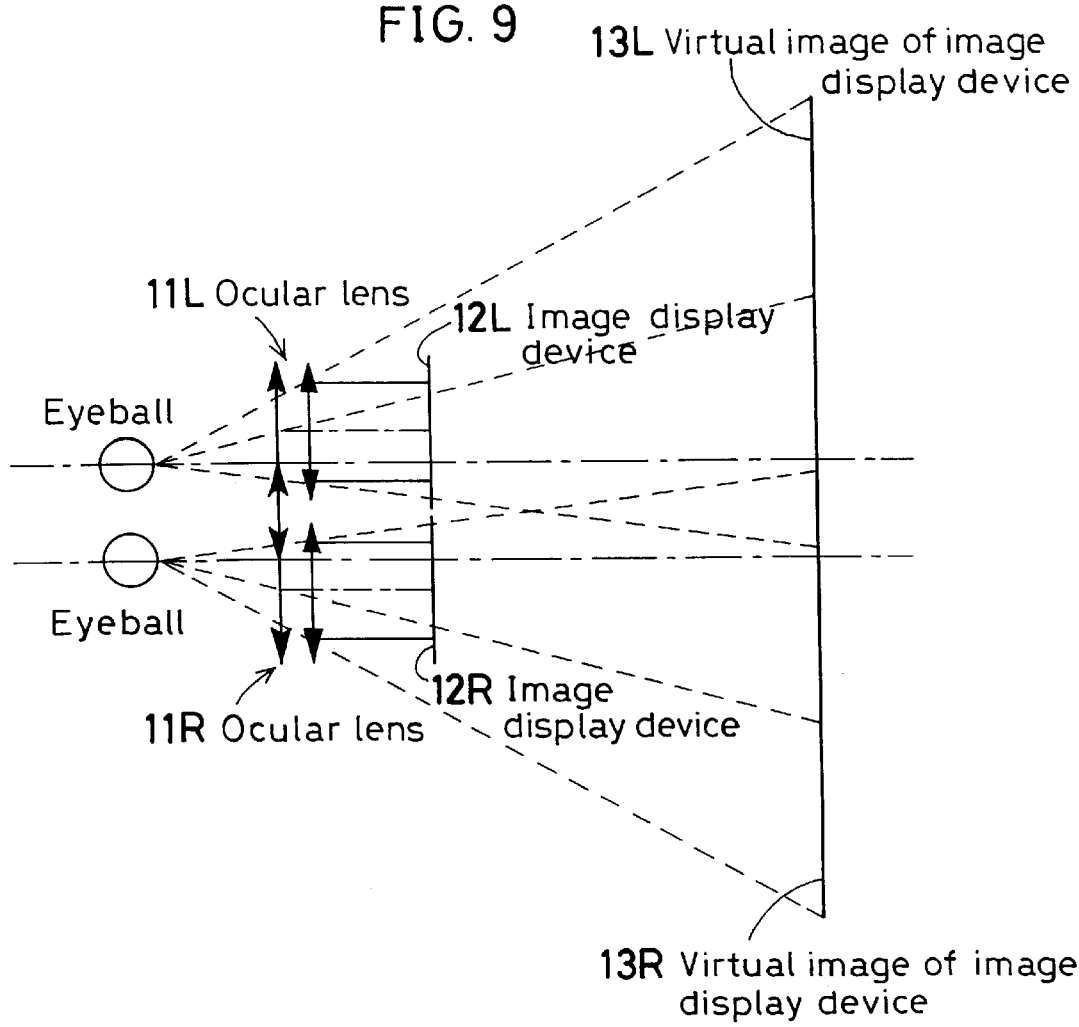
FIG. 9 shows the disposition of left and right optical systems in the image display apparatus according to the second aspect of the present invention.
Figure 10:
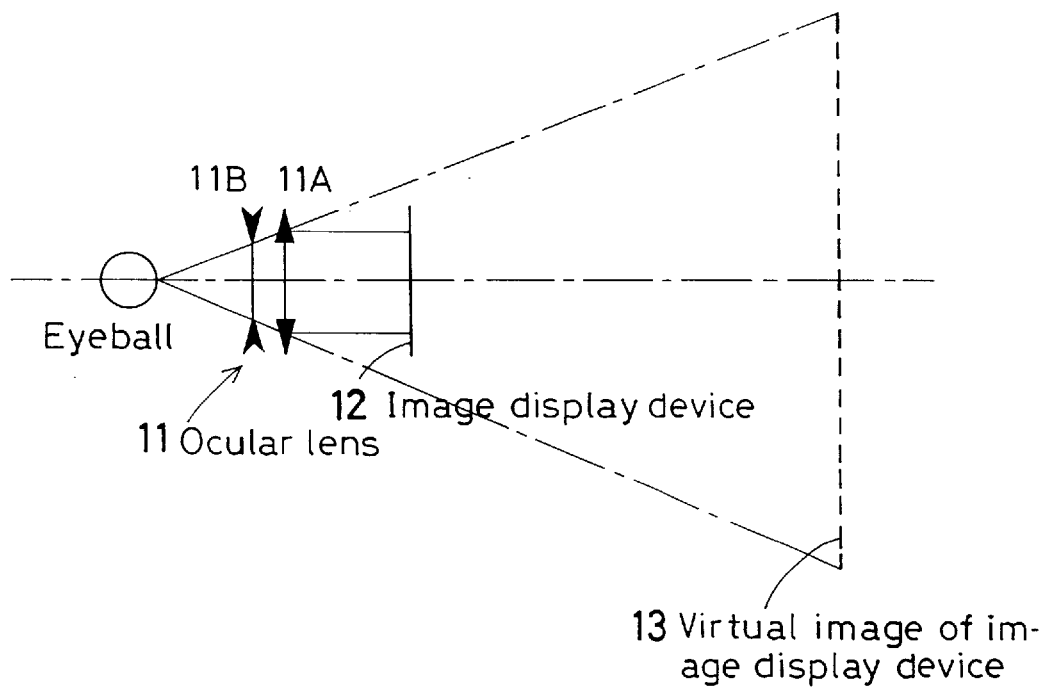
FIG. 10 shows a basic arrangement of an image display apparatus according to a third aspect of the present invention.
Figure 11:
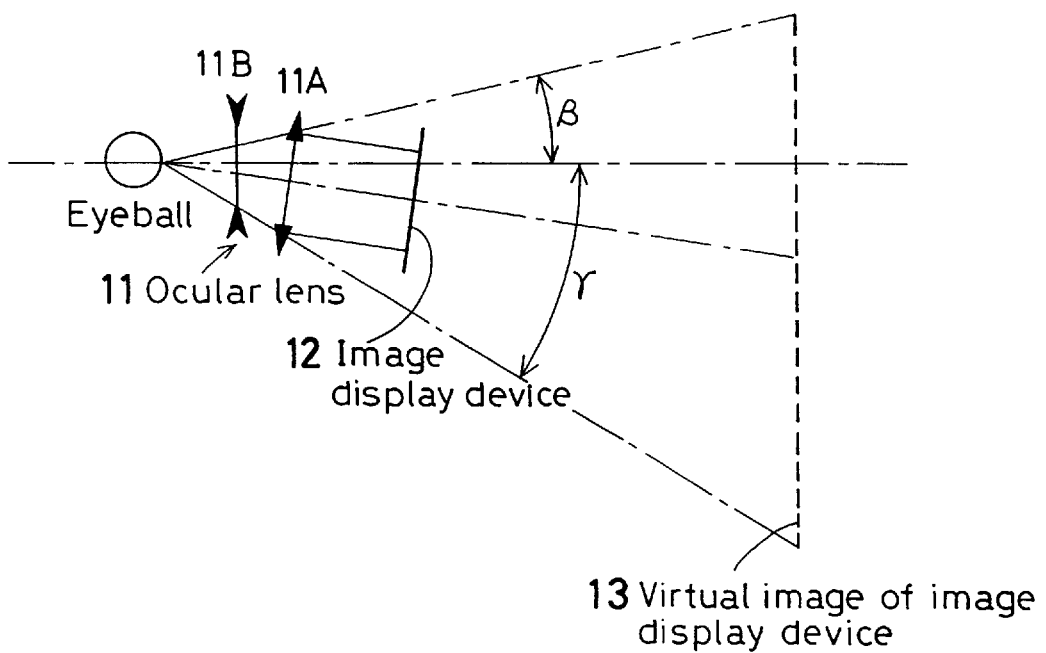
FIG. 11 shows the principle of the image display apparatus according to the third aspect of the present invention.
Figure 12:
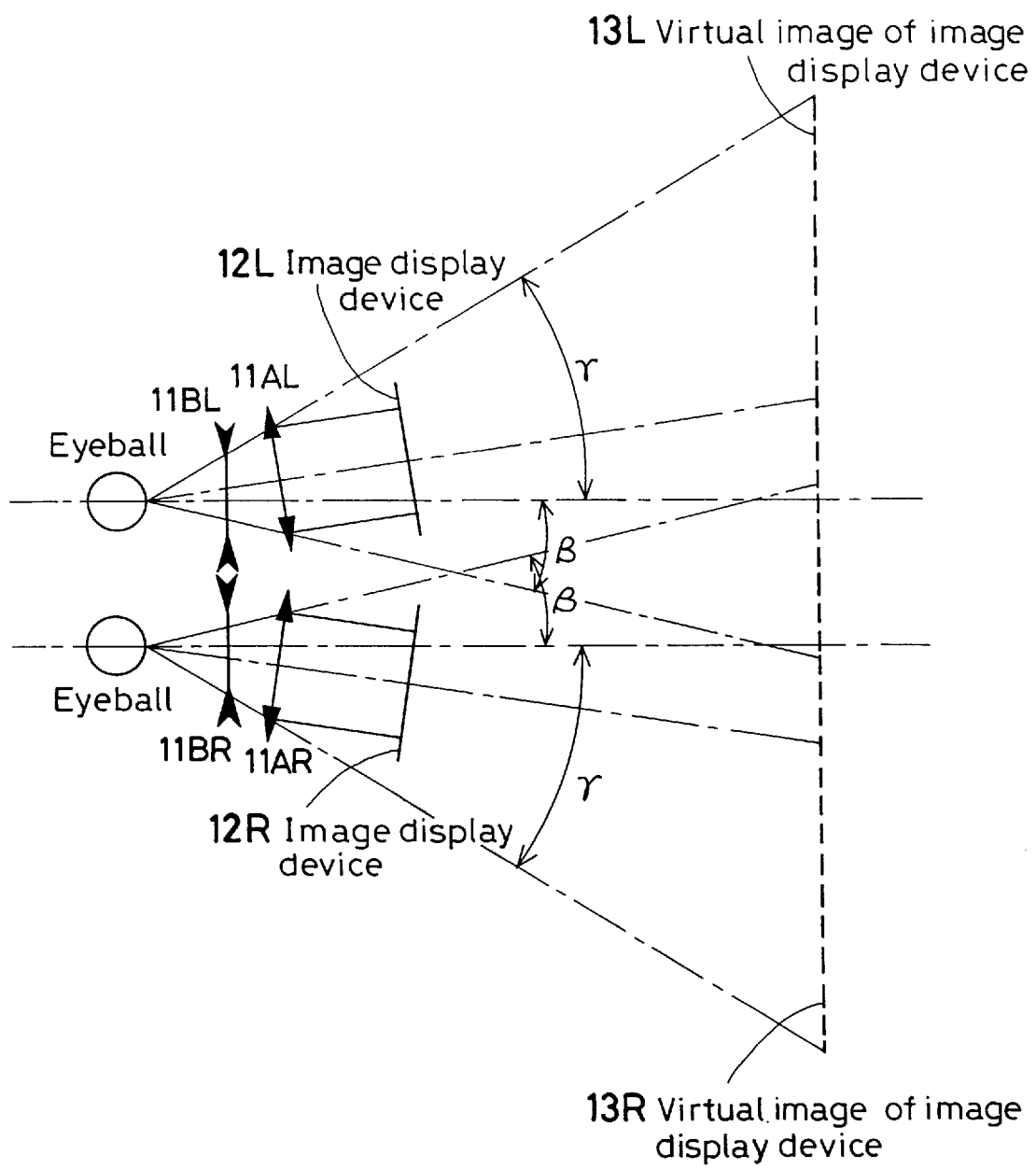
FIG. 12 shows the disposition of left and right optical systems in the image display apparatus according to the third aspect of the present invention.
Figure 13:
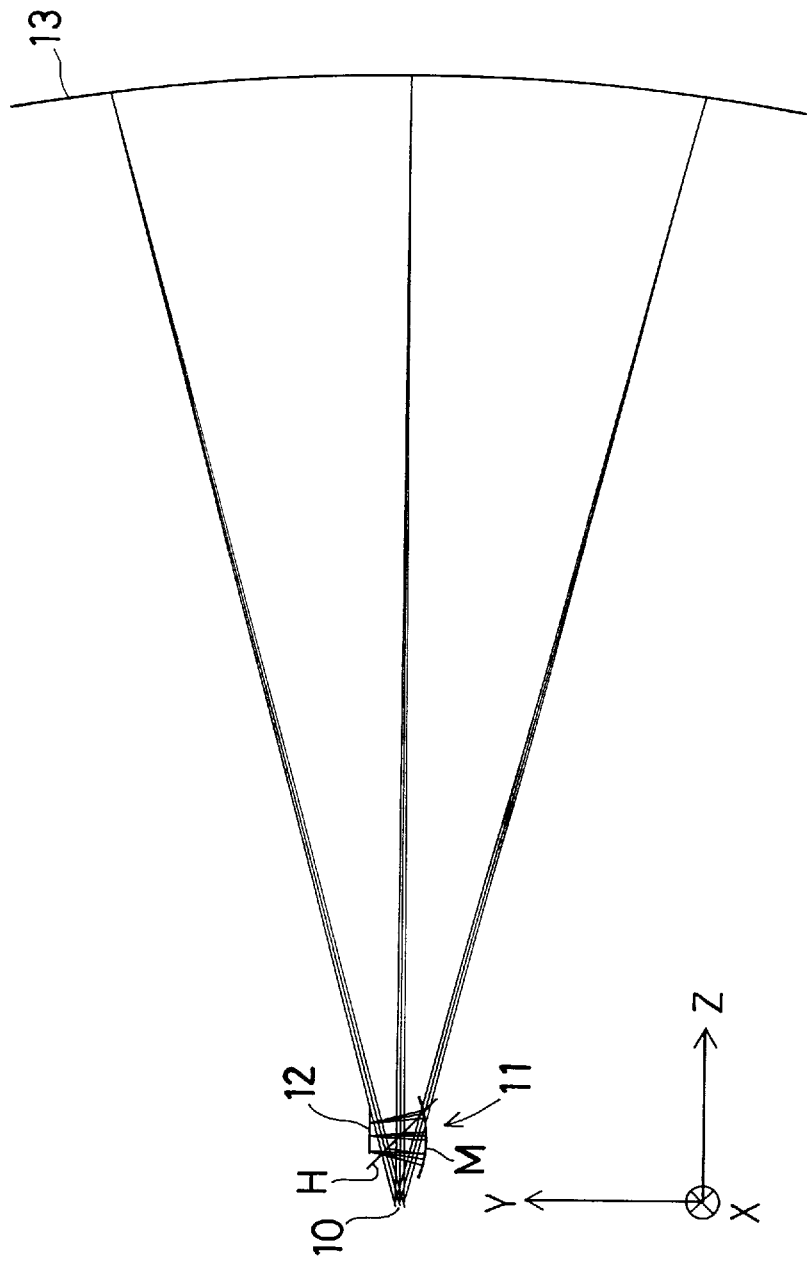
FIG. 13 is a sectional view of one ocular optical system according to Example 1.

Constituent parameters of Examples 1 to 5 will be shown later. In the following description, surface are shown as ordinal numbers in backward tracing from an observer's pupil position 10 toward an image display device 12 (also referred to as surface No. in the examples). A coordinate system is defined as follows: As shown in FIG. 13, with the observer's iris position 10 defined as the origin, the direction of an observer's visual axis is taken as a Z-axis, where the direction toward an ocular optical system 11 from the origin is defined as a positive direction. The vertical direction (as viewed from the observer's eyeball) which perpendicularly intersects the observer's visual axis is taken as a Y-axis, where the upward direction is defined as a position direction. The horizontal direction (as viewed from the observer's eyeball) which perpendicularly intersects the observer's visual axis is taken as an X-axis, where the leftward direction is defined as a positive direction. That is, the plane of the figure is defined as a YZ-plane, and a plane which is perpendicular to the plane of the figure is defined as an XZ-plane. Further, it is assumed that the optical axis is bent in the YZ-plane, which is parallel to the plane of the figure.

In the constituent parameters (shown later), regarding each surface for which an displacement Y and a tilt angle θ are shown, the displacement Y is a distance by which the vertex of the surface decenters in the Y-axis direction from the vertex of the preceding surface. The tilt angle θ is the angle of inclination of the central axis of the surface from the central axis of the preceding surface. In this case, positive θ means counterclockwise rotation. It should be noted that a surface without indication of displacement Y and tilt angle θ is coaxial with respect to the preceding surface.

Surface separation is a distance from the surface concerned to the next surface along the Z-axis when it is assumed that there is no decentration, and this position is defined as a reference point. A point which decenters from the reference point in the direction Y by the given displacement is the vertex of the next surface. Regarding the coaxial portion, the surface separation is the axial distance from the surface concerned to the next surface. It should be noted that surface separations are shown with the direction of backward tracing along the optical axis defined as a positive direction.

The rotationally symmetric aspherical configuration of each surface may be expressed by.

$$Z=[(h^2/R)/[1+\{1-(h^2/R^2)\}^{1/2}]+Ah^4+Bh^6+Ch^8$$

where R is the paraxial curvature radius; A, B and C are 4th-, 6th- and 8th-order aspherical coefficients, respectively; and h is given by $h^2=X^2+Y^2$.

It should be noted that the refractive index of a medium between surfaces is expressed by the refractive index for the spectral d-line. Lengths are given in millimeters. Aspherical coefficients which are not shown are zero.

EXAMPLE 1

Figure 14:
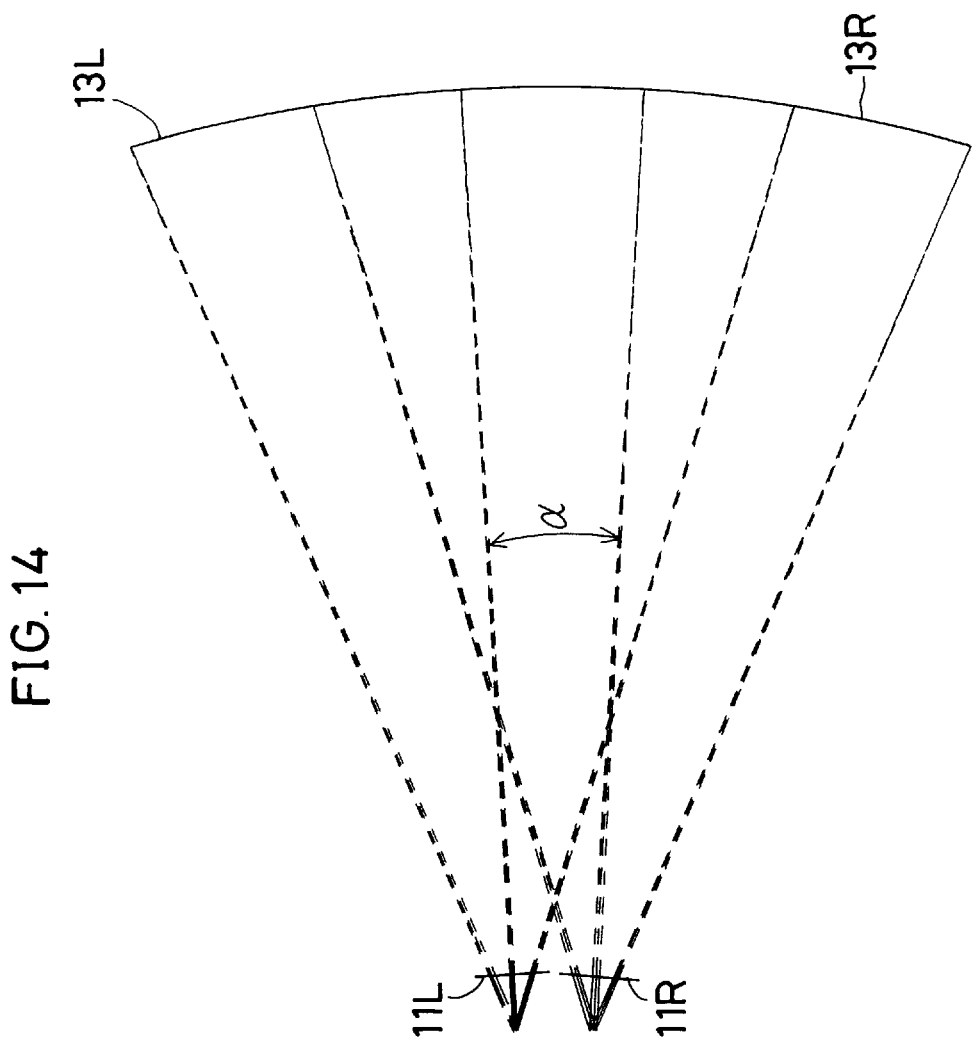
FIG. 14 is a plan view of an arrangement in which two ocular optical systems according to Example 1 are disposed in parallel.

FIG. 13 is a sectional view of one ocular optical system 11 according to this example. FIG. 14 is a plan view of an arrangement in which ocular optical systems 11L and 11R, arranged as shown in FIG. 13, are disposed in parallel for left and right eyes. As shown in these figures, this example uses an ocular optical system including a concave mirror M and a half-mirror H.

The ocular optical system 11 produces positive curvature of field (i.e. curvature of field in which the center of curvature of a spherical image surface lies forward of the image surface). However, in an area where a right virtual image 13R and a left virtual image 13L overlap each other, the two image surfaces are made coincident with each other, as shown in FIG. 14. Accordingly, a wide field can be ensured. Moreover, the observer can readily fuse the two images. This enables observation without fatigue.

In this example,
d=65 millimeters
R=−872.896 millimeters
α=10°
Diopter=−500 millimeters
These values satisfy the above Eq. (2).
Further, in this example,
f=25.000
PS.f=−1.00

EXAMPLE 2

Figure 15:
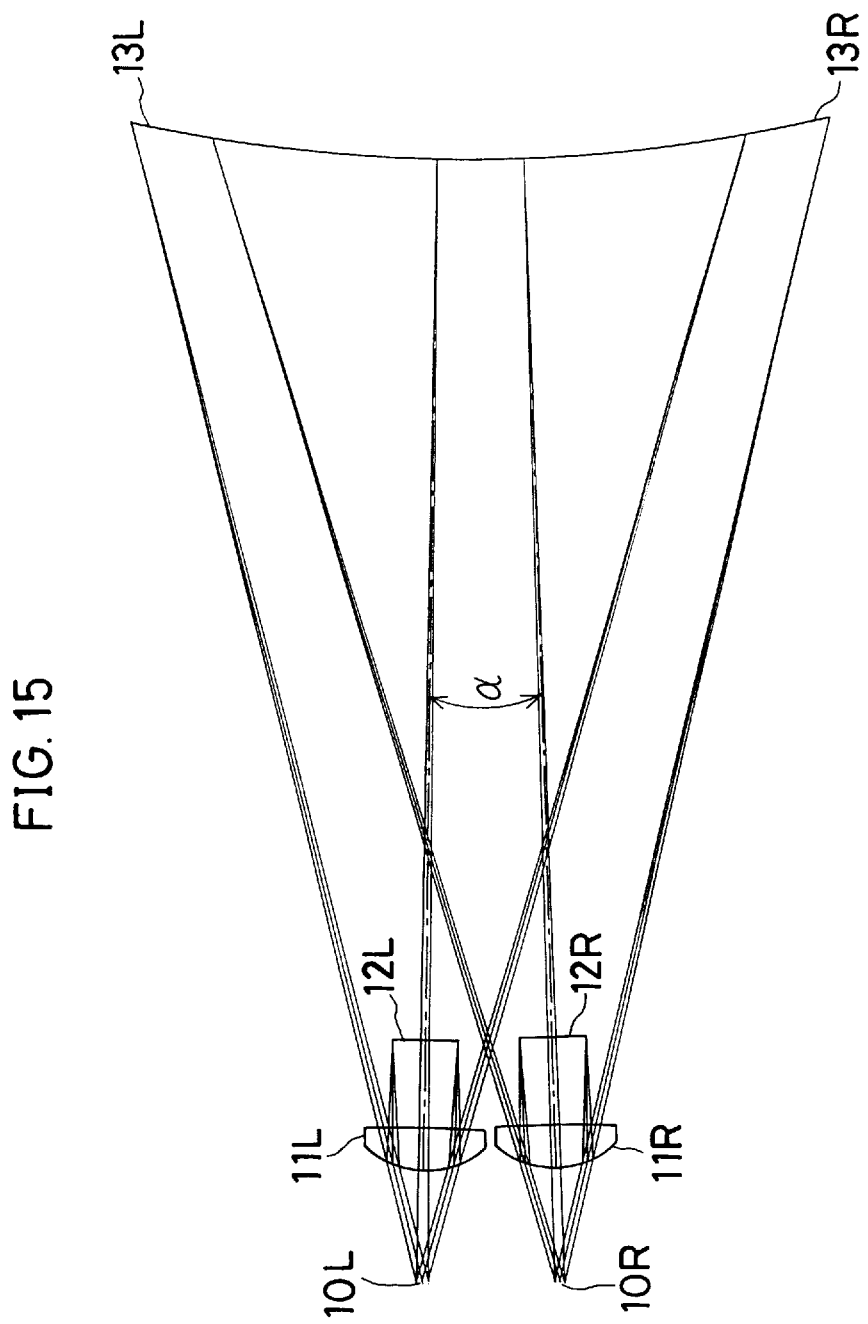
FIG. 15 is a plan view of an arrangement in which two ocular optical systems according to Example 2 are disposed in parallel.

FIG. 15 is a plan view of an arrangement in which ocular optical systems 11L and 11R according to this example are disposed in parallel for left and right eyes. As shown in the figure; this example uses magnifier type ocular optical systems 11L and 11R.

The ocular optical systems 11L and 11R each produce negative curvature of field (i.e. curvature of field in which the center of curvature of a spherical image surface lies rearward of the image surface). However, in an area where a right virtual image 13R and a left virtual image 13L overlap each other, the two image surfaces are made coincident with each other, as shown in FIG. 15.

In this example,
d=65 millimeters
R=457 millimeters
α=4.92°
Diopter=−300 millimeters
These values satisfy the above Eq. (1).
Further, in this example,
f=31.199
PS.f=0.706

EXAMPLE 3

Figure 16:
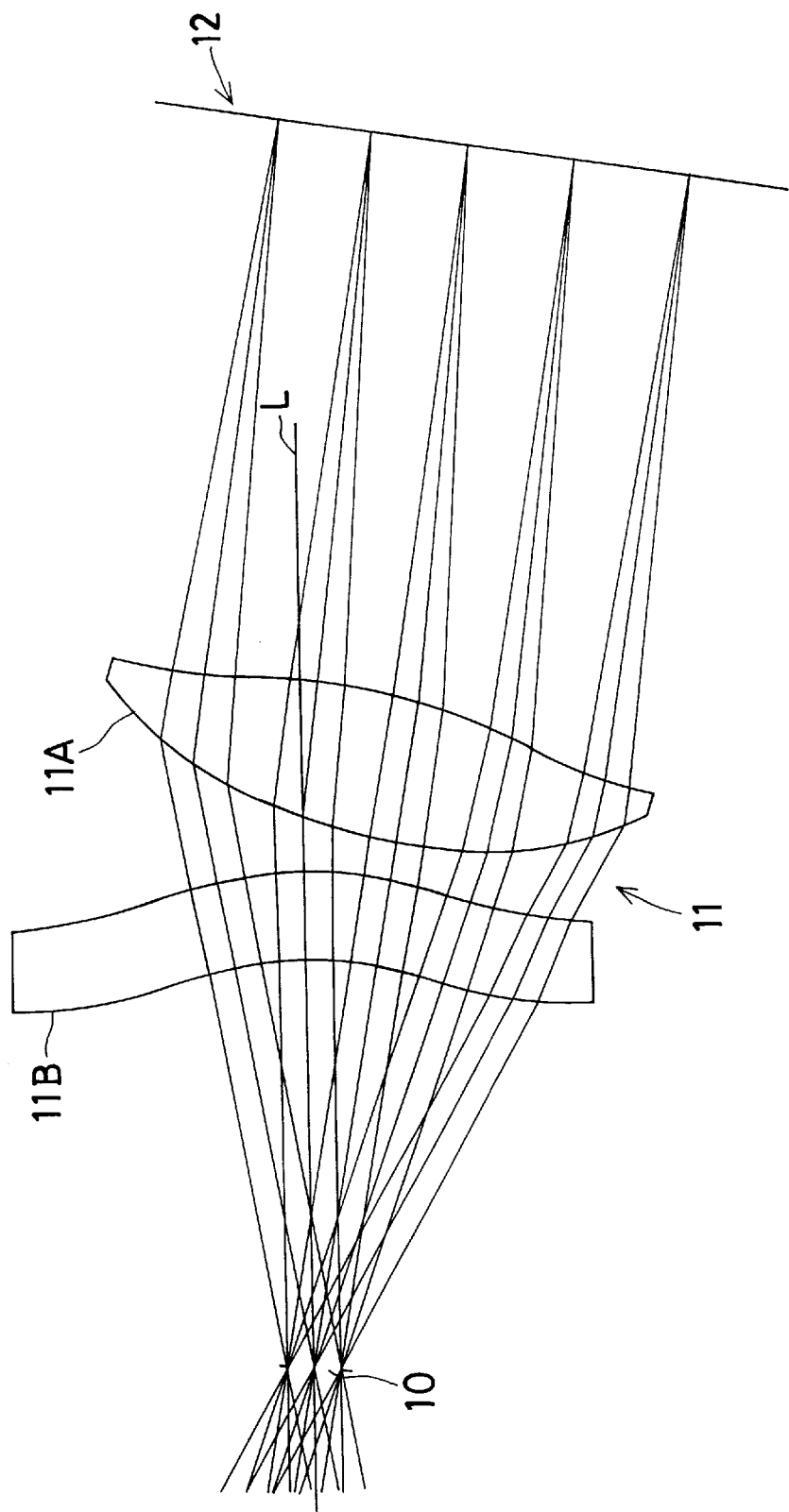
FIG. 16 is a sectional view of one ocular optical system according to Example 3.
Figure 17:
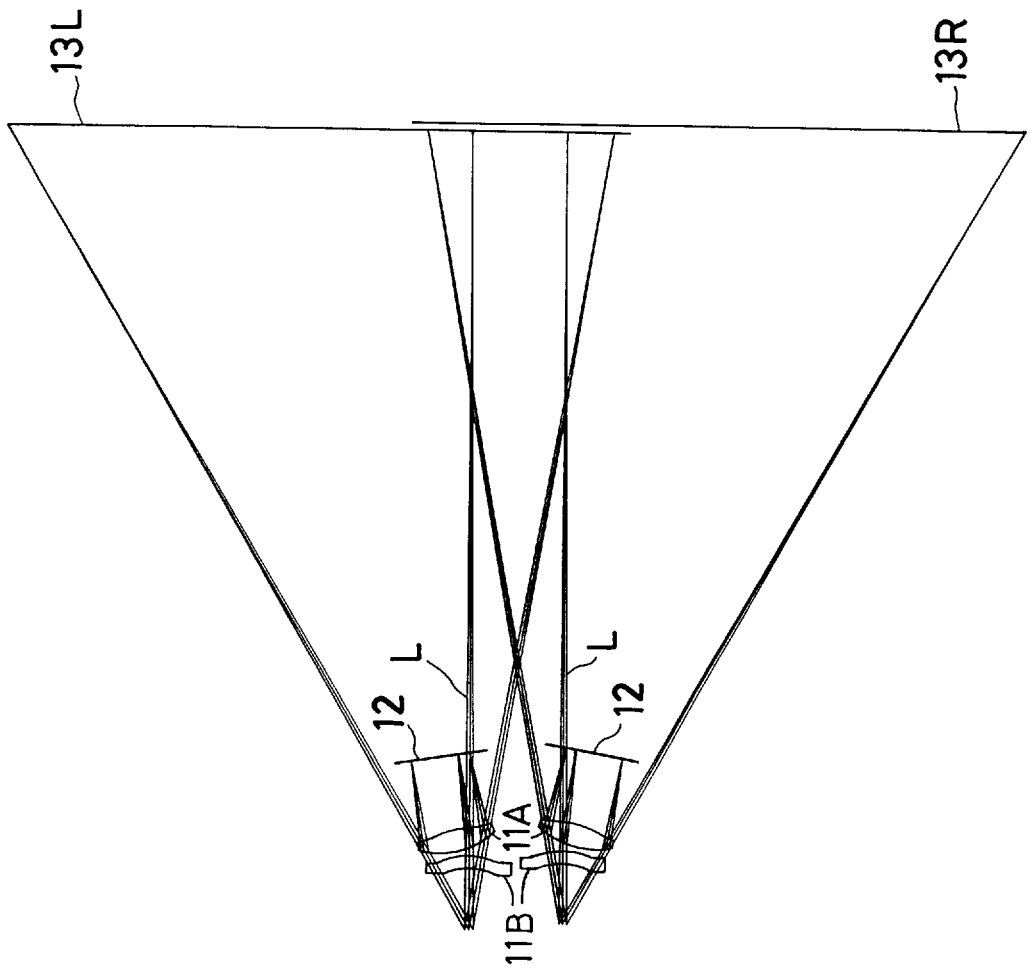
FIG. 17 is a plan view of an arrangement in which two ocular optical systems according to Example 3 are disposed in parallel.

FIG. 16 is a sectional view of one ocular optical system 11 according to this example. FIG. 17 is a plan view of an arrangement in which ocular optical systems arranged as shown in FIG. 16 are disposed in parallel for left and right eyes. As shown in these figures, this example uses an ocular optical system 11 including a magnifier type ocular lens 11A and a diopter correcting lens 11B of negative power.

An image displayed on an image display device 12 is formed into parallel rays by a magnifier type ocular lens 11A and then formed as a virtual image 13 (13L or 13R) by a diopter correcting lens 11B of negative power. Because the virtual image 13 is perpendicular to an optical axis L, if the ocular optical system is disposed for each eye as shown in FIG. 17, a wide field angle can be achieved with the two image surfaces coincident with each other in an area where the right virtual image 13R and the left virtual image 13L overlap each other. It should be noted that in FIG. 17 the right virtual image 13R and the left virtual image 13L are shown to be displaced relative to each other for the purpose of facilitating understanding.

Curvature of field is favorably corrected by the lens 11A of positive power and the lens 11B of negative power.

The image display device 12 and the magnifier type ocular lens 11A may be arranged in the form of either a non-decentered optical system or a decentered optical system.

To change the diopter, diopter correcting lenses 11B having different negative powers should be used. In such a case, the diopter can be changed simply by changing a diopter correcting lens 11B for another.

In this example,
f=31.000
PS.f=0.588

EXAMPLE 4

Figure 18:
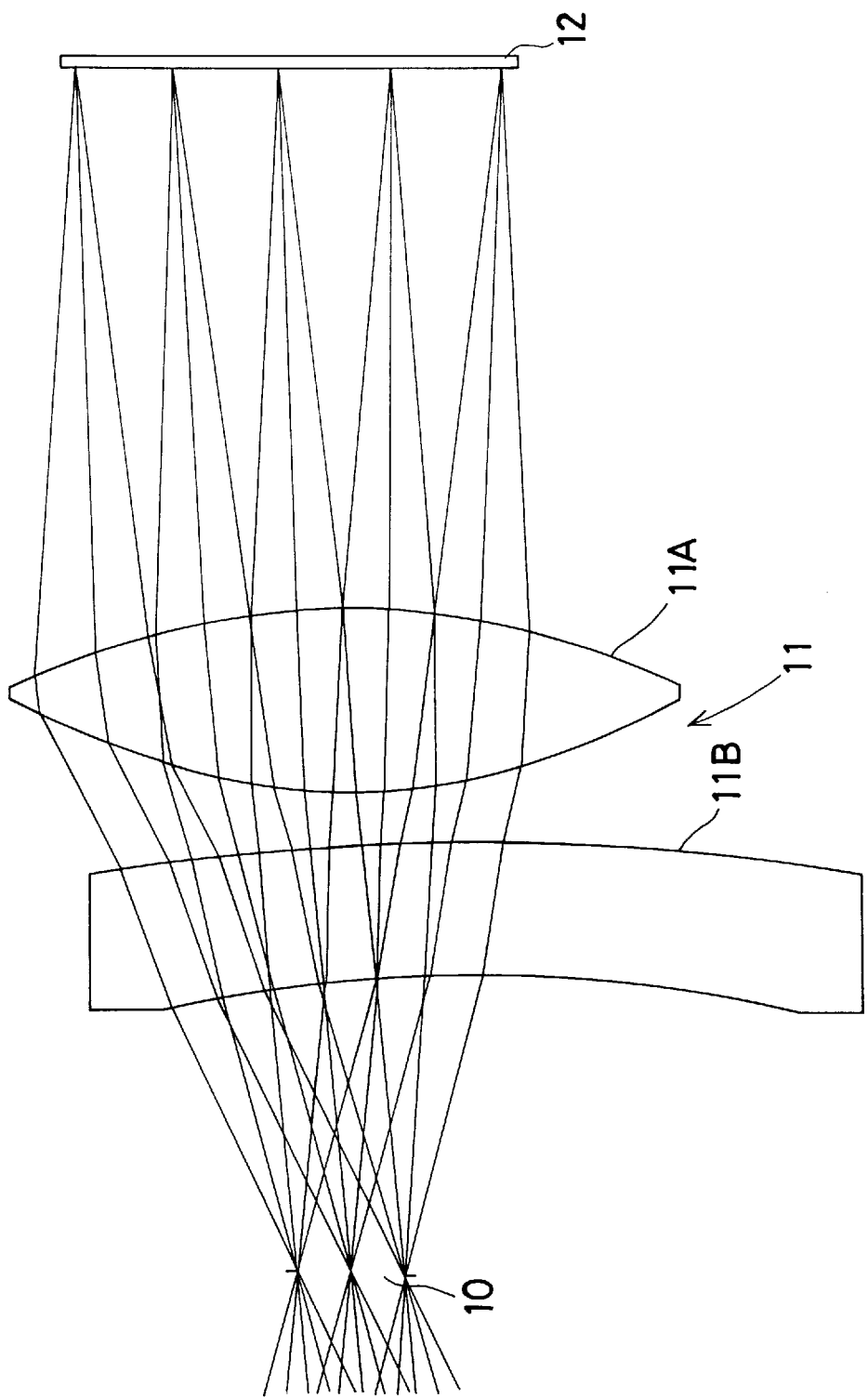
FIG. 18 is a sectional view of one ocular optical system according to Example 4.
Figure 19:
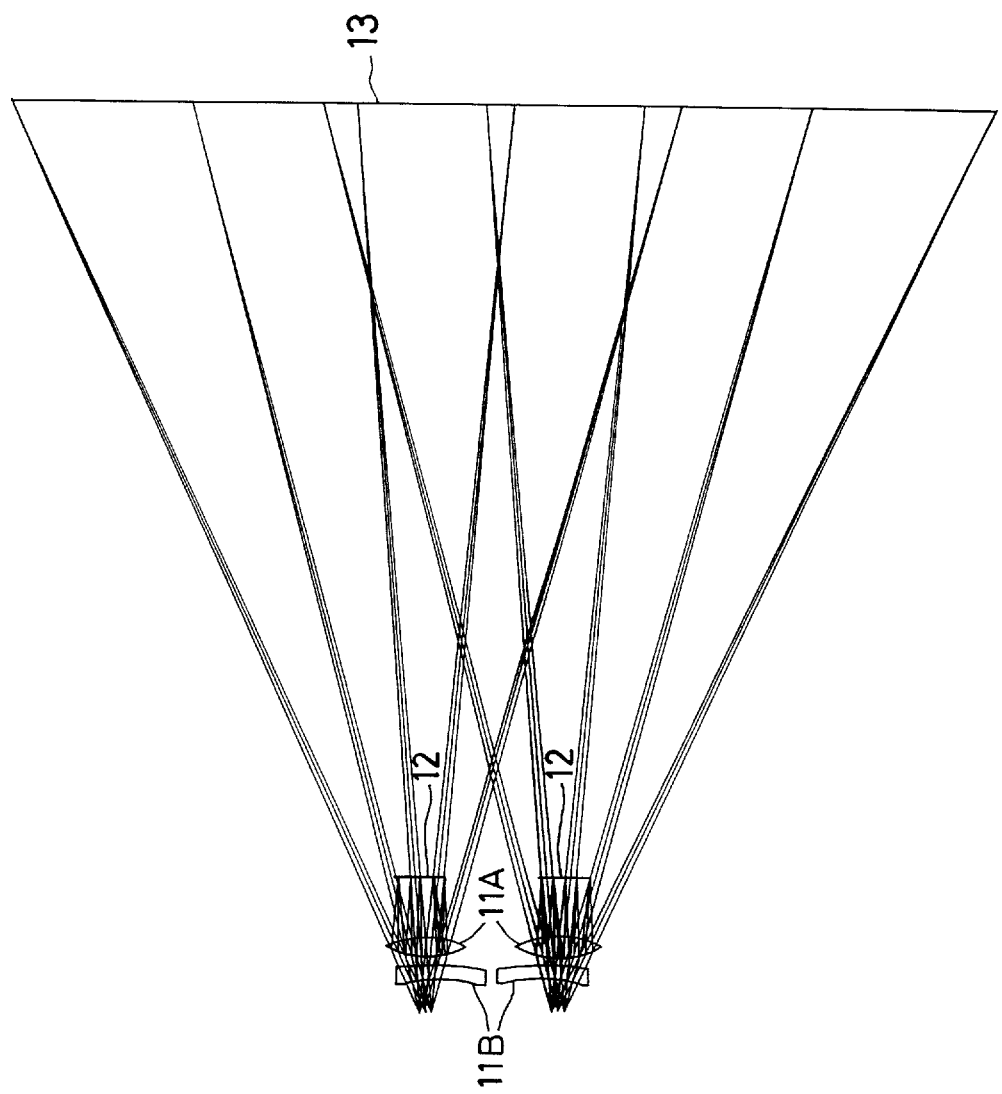
FIG. 19 is a plan view of an arrangement in which two ocular optical systems according to Example 4 are disposed in parallel.

FIG. 18 is a sectional view of one ocular optical system 11 according to this example. FIG. 19 is a plan view of an arrangement in which ocular optical systems arranged as shown in FIG. 18 are disposed in parallel for left and right eyes. This example uses an ocular optical system 11 including a magnifier type ocular lens 11A and a diopter correcting lens 11B of negative power.

In Example 3 the lens 11A of positive power and the image display device 12 are tilted, whereas, in this example the lens 11A of positive power and the image display device 12 are decentered.

In this example:
f=25.000
PS.f=0.663

EXAMPLE 5

Figure 20:
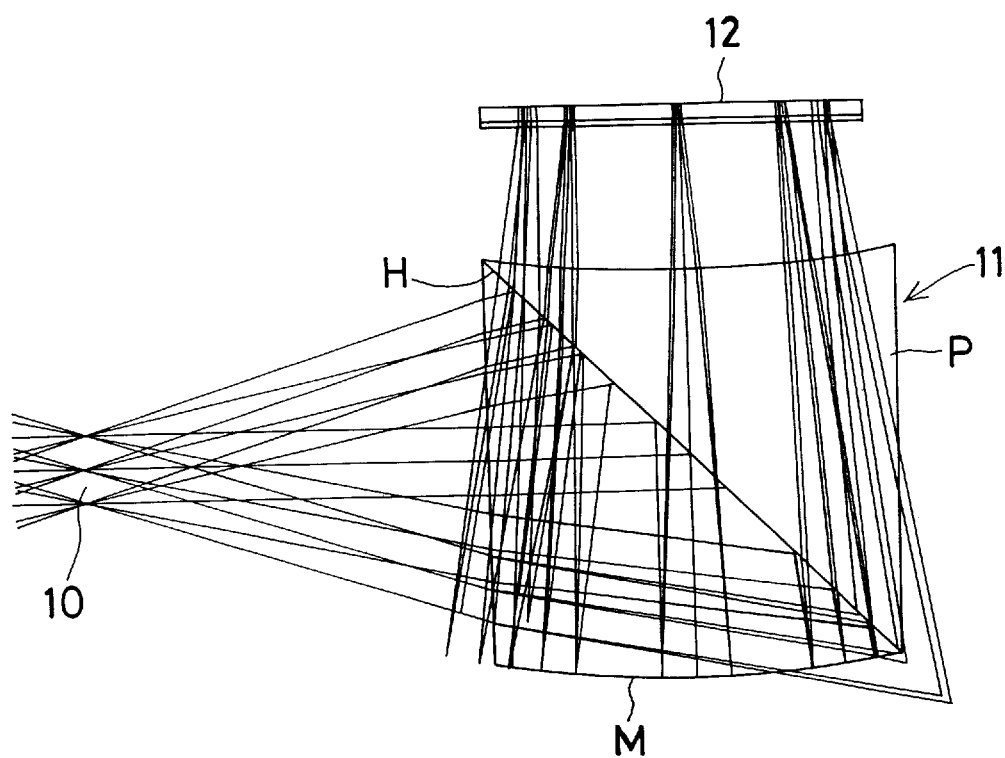
FIG. 20 is a sectional view of one ocular optical system according to Example 5.
Figure 21:
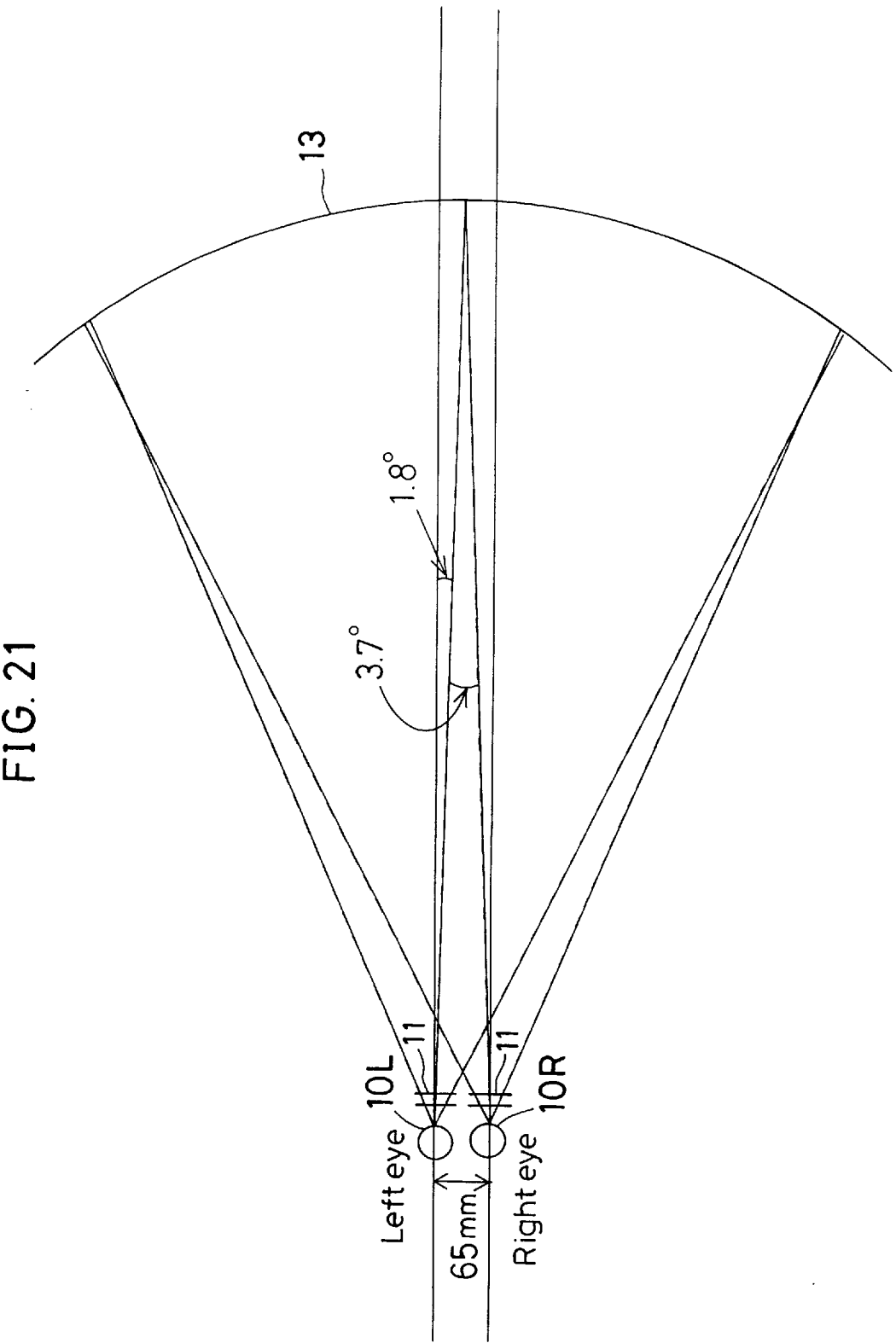
FIG. 21 is a plan view of an arrangement in which two ocular optical systems according to Example 5 are disposed in parallel.
Figure 22:
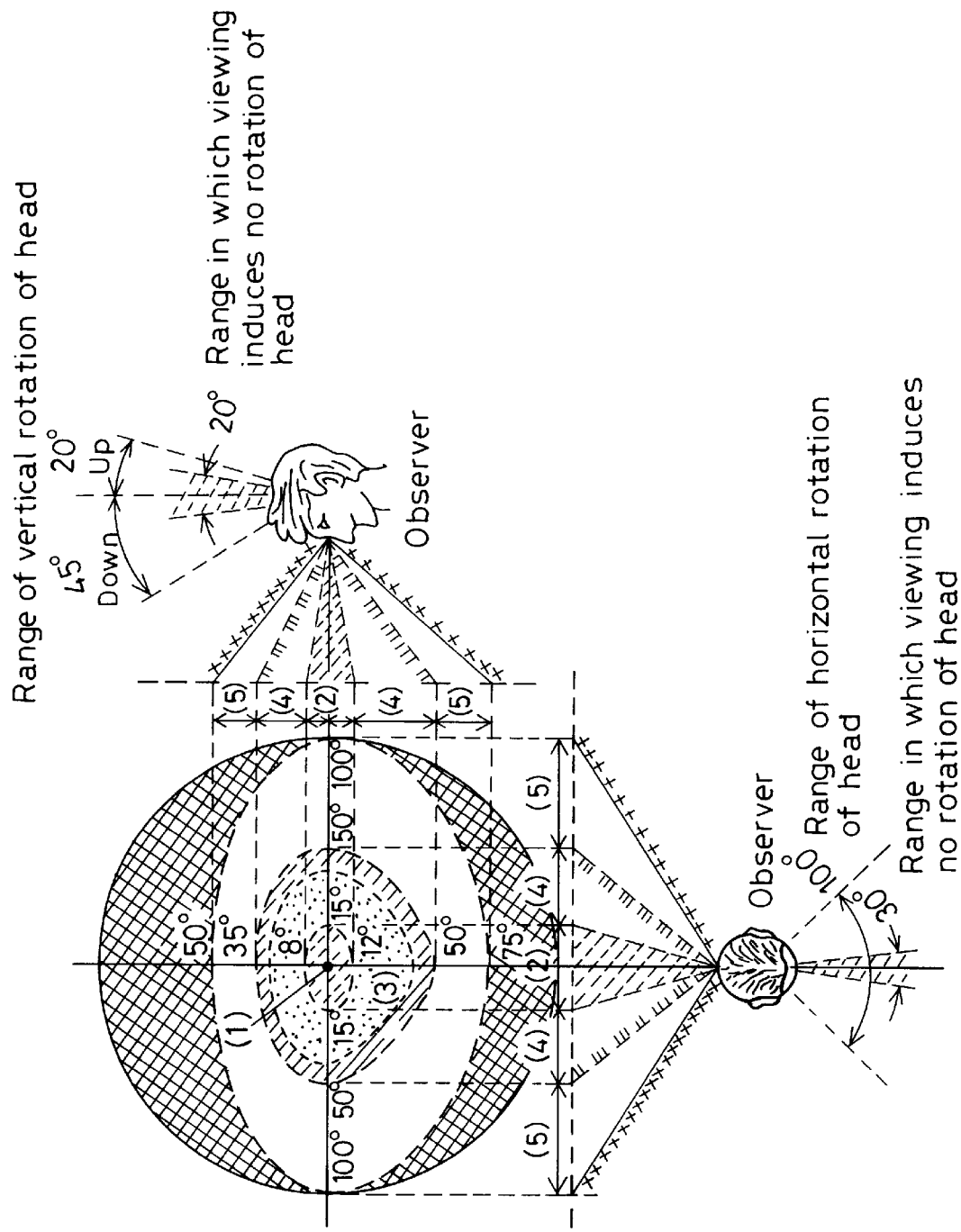
FIG. 22 shows viewing angle characteristics of human eyes.
Figure 23:
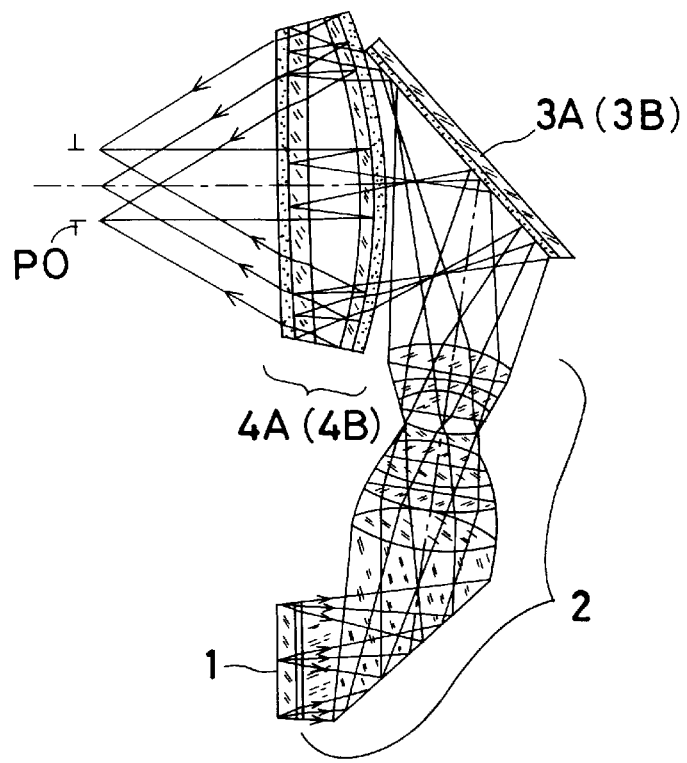
FIG. 23 is a side view of a conventional image display apparatus.
Figure 24:
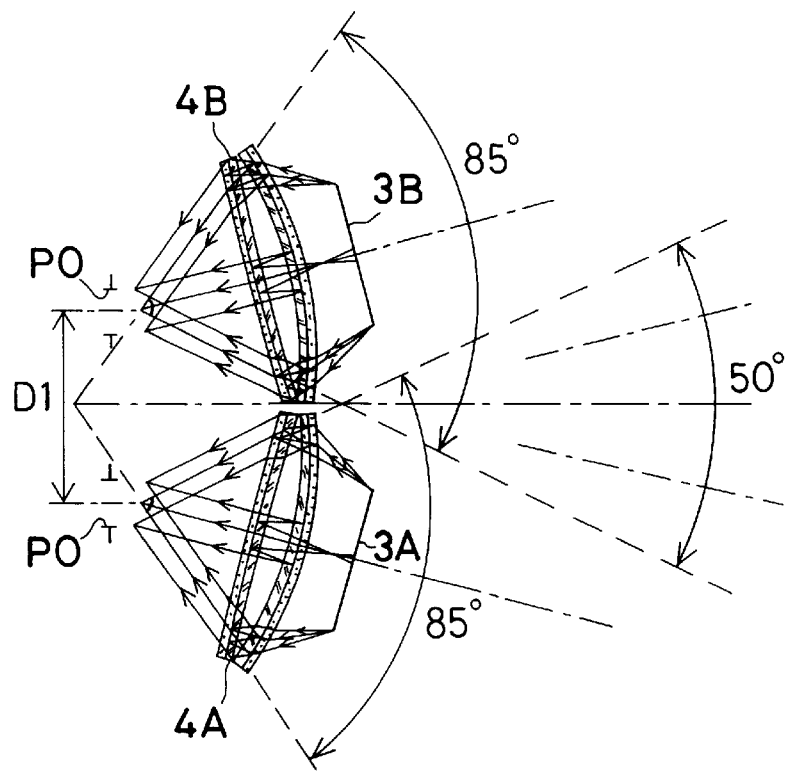
FIG. 24 is a plan view of the conventional image display apparatus shown in FIG. 23.
Figure 25:
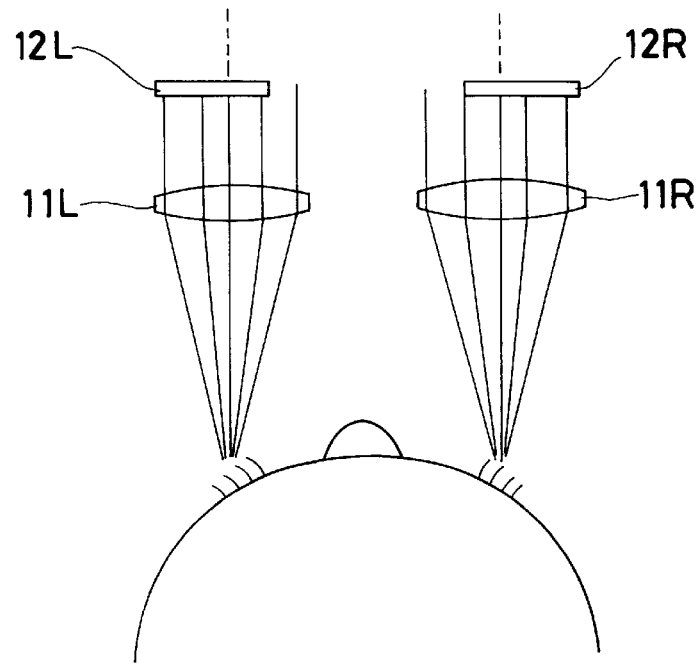
FIG. 25 is a plan view of another conventional image display apparatus.
Figure 26:
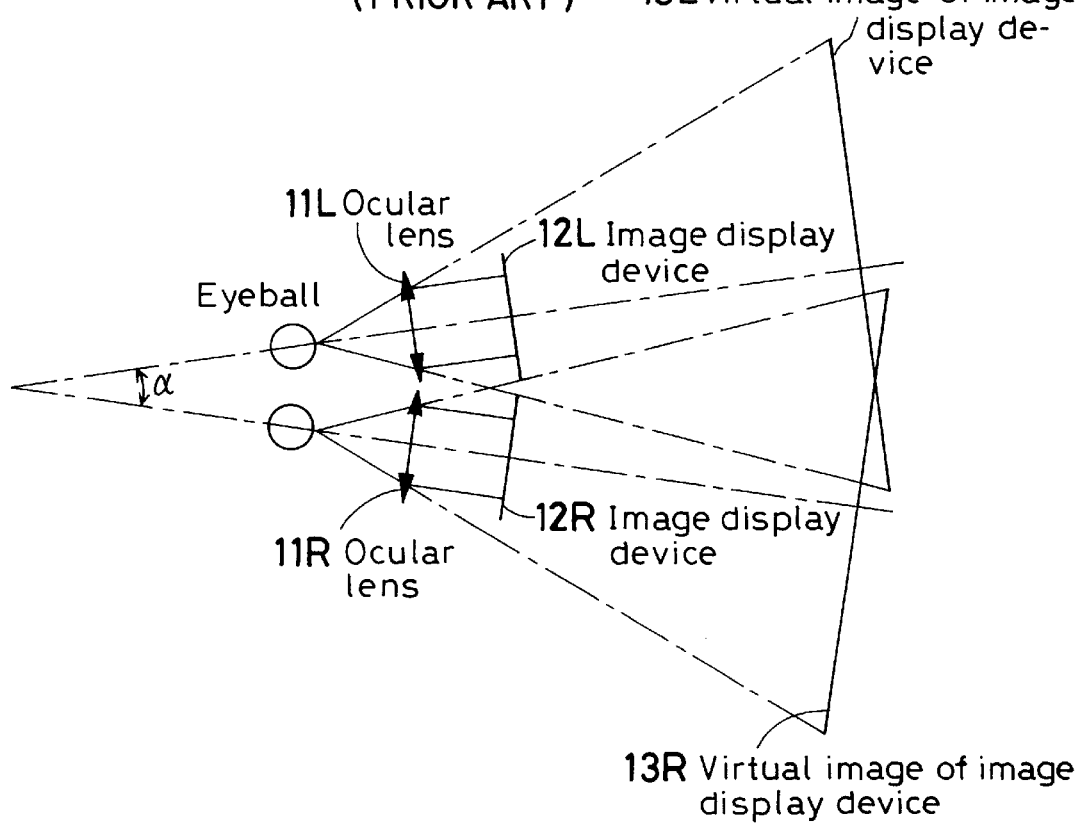
FIG. 26 is a view for explanation of problems associated with the conventional image display apparatus shown in FIG. 24.
Figure 27A:
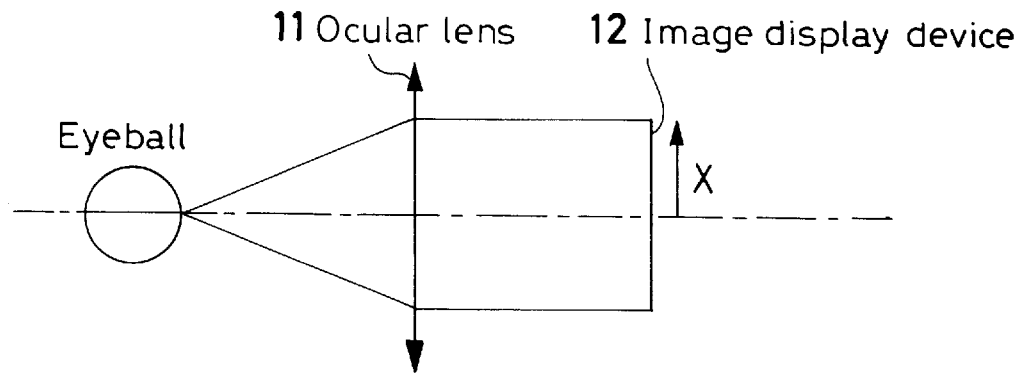
FIGS. 27(a) and 27(b) are views for the explanation of problems associated with the conventional image display apparatus shown in FIG. 25.
Figure 27B:
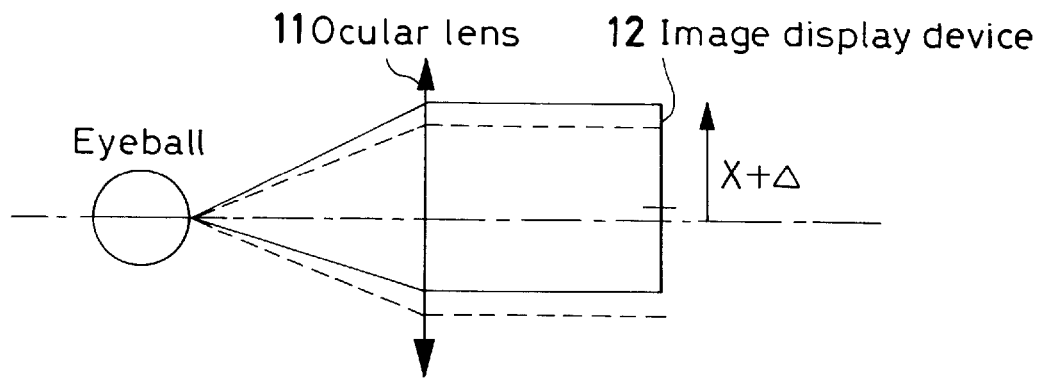
Figure 28:
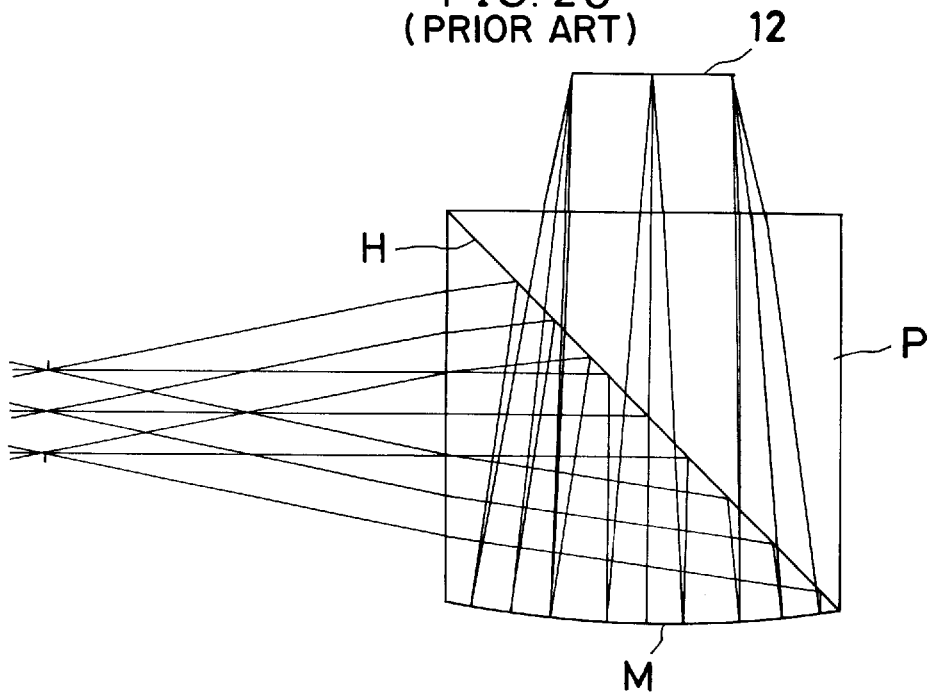
FIG. 28 is a sectional view of a conventional ocular optical system that uses a prism including a concave mirror and a half-mirror.

FIG. 20 is a sectional view (YZ-plane) of one ocular optical system 11 according to this example. FIG. 21 is a plan view (XZ-plane) of an arrangement in which two ocular optical systems 11, arranged as shown in FIG. 20, are disposed in parallel for left and right eyes. This example uses an ocular optical system 11 formed by integrating the concave mirror M and the half-mirror H in Example 1 with a beam splitter prism P.

The radius of curvature of an optimum image surface formed by the ocular optical system 11 is −667 millimeters (the radius of curvature of the Petzval surface is −57 millimeters).

Assuming that
Diopter=−1 diopter
Interpupillary distance=65 millimeters,
then
Vergence angle α=3.7°
and
Lateral magnification M=39

Therefore, to optimize the system for a user having an interpupillary distance of 65 millimeters, each image display device 12 is shifted inward by 0.83 millimeters. By doing so, the virtual image shifts inward by 0.83×M=32 millimeters.

To allow left and right image surfaces 13L and 13R to coincide with each other at a position where the two image surfaces overlap each other, each image display device 12 is inclined at 0.0012° (α/(2M$^2$)). By doing so, the virtual image can be inclined at 1.8° (α/2).

Numerical data in each example is as follows:

| Surface No. | Radius of curvature | Separation | Refractive index (displacement) | (tilt angle) |
|---|---|---|---|---|
| Example 1: | | | | |
| 1 | ∞ (pupil) | 31.000 | | |
| 2 | ∞ (half-mirror) | −11.000 | | Θ 45.00° |
| 3 | 50.000 (concave mirror) | 24.266 | | |
| 4 | ∞ (image display device) | | | |
| Example 2: | | | | |
| 1 | ∞ (pupil) | 29.919 | | |
| 2 | 18.837 A −0.244773 × $10^{-4}$ B 0 | 12.000 | 1.51633 | |
| 3 | −348.432 | 23.398 | | |
| 4 | ∞ (image display device) | | | |
| Example 3: | | | | |
| 1 | ∞ (pupil) | 23.000 | | |
| 2 | −19.615 A 0.986691 × $10^{-4}$ B 0 | 5.000 | 1.51633 | |
| 3 | −22.160 A 0.684620 × $10^{-4}$ B 0 | 2.000 | | |
| 4 | 31.803 A 0.975451 × $10^{-5}$ B 0.494702 × $10^{-7}$ | 8.000 Y −3.387 | 1.51633 | Θ −15.00° |
| 5 | −33.165 A 0.243705 × $10^{-4}$ B 0.878742 × $10^{-7}$ | 30.136 | | |
| 6 | ∞ (image display device) | Y 3.107 | | Θ 5.41° |
| Example 4: | | | | |
| 1 | ∞ (pupil) | 11.560 | | |
| 2 | −59.018 | 5.000 Y −5.000 | 1.51633 | |
| 3 | −98.095 | 2.000 | | |
| 4 | 19.742 A −0.409620 × $10^{-4}$ B 0 | 7.000 Y 5.000 | 1.51633 | |
| 5 | −29.418 | 20.765 | | |
| 6 | ∞ (image display device) | | | |
| Example 5: | | | | |
| 1 | ∞ (pupil) | 23.000 | | |
| 2 | ∞ | 11.250 | 1.52540 | |
| 3 | ∞ (half-mirror) | −12.750 | 1.52540 | Θ 45.00° |
| 4 | 77.211 (concave mirror) | 23.750 | 1.52540 | |
| 5 | 681.335 A 0.476470 × $10^{-4}$ B −0.998615 × $10^{-7}$ C 0.970000 × $10^{-10}$ | 8.463 | | |
| 6 | ∞ (cover glass and polarizer) | 1.020 | 1.51633 | |
| 7 | ∞ (image display surface of image display device) | | | |

As has been described above, it is possible according to the present invention to provide a head- or face-mounted image display apparatus having compact and wide-field ocular optical systems designed to form readily fusible virtual images.

What I claim is:

1. A head- or face-mounted image display apparatus comprising:

an image display unit; and an optical system for projecting an image displayed by said image display unit into an observer's eyeball, wherein said optical system comprises an optical system of infinite diopter and an optical system of negative power, and wherein a virtual image for an observer's right eye and a virtual image for an observer's left eye overlap each other through at least 30°.

2. An image display apparatus according to claim 1, wherein either said optical system of infinite diopter or said image display unit is decentered.

3. An image display apparatus according to claim 2, wherein an amount of decentration of either said optical system of infinite diopter or said image display unit is variable.

4. A head-or face-mounted image display apparatus comprising:

an image display unit for displaying an image;

a right optical system for leading said image to an observer's right eye; and a left optical system for leading said image to an observer's left eye, wherein said right and left optical systems have such curvature of field that an image surface position of a right virtual image for the observer's right eye formed by said right optical system and an image surface position of a left virtual image for the observer's left eye formed by said left optical system are approximately coincident with each other in at least an overlap area where said right and left virtual images overlap each other, said right and left optical systems each have positive curvature of field in which a center of curvature of an image surface lies forward of the image surface, and said head-or face-mounted image display apparatus satisfies the condition $$1.0 \leq PS.f < 0.1$$

wherein f represents a focal length of each optical system, and PS is a Petzval sum of each optical system.

5. An image display apparatus according to claim 4, wherein said right and left optical systems are formed so as to add such curvature of field that said right and left virtual images are formed on approximately the same curved surface in at least said overlap area.

6. An image display apparatus according to claim 4, wherein an angle between said right optical system and said left optical system is variable according to positions where said right and left virtual images are formed or according to proportions in which said right and left virtual images overlap so that the image surface positions of said right and left virtual images are approximately coincident with each other in an area where the image surfaces of said right and left virtual images overlap each other.

7. An image display apparatus according to claim 4, wherein said right and left optical systems each have a concave mirror.

8. An image display apparatus according to claim 4, wherein said right virtual image and said left virtual image overlap each other through at least 30°.

9. An image display apparatus according to claim 4, wherein an optical axis led from said right optical system to the observer's right eye and an optical axis led from said left optical system to the observer's left eye are approximately parallel to each other, and wherein said image display unit has a right image display device for forming an image for the observer's right eye, and a left image display device for forming an image for the observer's left eye, said right and left image display devices being displaced toward each other.

10. An image display apparatus according to claim 9, wherein said right and left image display devices are tilted in opposite directions to each other.

11. An image display apparatus according to claim 9, wherein said right and left optical systems have positive curvature of field, and said right and left image display devices are tilted in respective directions in which lines normal to their image display surfaces approach each other.

12. An image display apparatus according to claim 9, wherein said right and left optical systems have negative curvature of field, and said right and left image display devices are tilted in respective directions in which lines normal to their image display surfaces come away from each other.

* * * * *